(12) United States Patent
Ikehashi et al.

(10) Patent No.: US 8,564,928 B2
(45) Date of Patent: Oct. 22, 2013

(54) MEMS DEVICE HAVING A MOVABLE STRUCTURE

(75) Inventors: Tamio Ikehashi, Yokohama (JP);
Tomohiro Saito, Yokohama (JP);
Yasushi Tomizawa, Fuchu (JP); Kei Masunishi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 194 days.

(21) Appl. No.: 12/883,660

(22) Filed: Sep. 16, 2010

(65) Prior Publication Data

US 2011/0063774 A1   Mar. 17, 2011

(30) Foreign Application Priority Data

Sep. 16, 2009  (JP) ................................. 2009-214807

(51) Int. Cl.
*H01G 5/16* (2006.01)
*H01G 7/00* (2006.01)
*H01G 5/00* (2006.01)

(52) U.S. Cl.
USPC ............................ 361/290; 361/280; 361/277

(58) Field of Classification Search
USPC ........................... 361/277, 280, 281, 290, 287
See application file for complete search history.

(56) References Cited

U.S. PATENT DOCUMENTS 6,307,424 B1 * 10/2001 Lee ................................ 327/530
7,042,698 B2 * 5/2006 Won et al. ...................... 361/277
7,145,284 B2 * 12/2006 Ikehashi ........................ 310/348
7,299,538 B2   11/2007 Tactic-Lucic
8,138,655 B2 * 3/2012 Ikehashi et al. ............... 310/309
2009/0001845 A1 1/2009 Ikehashi
2011/0127878 A1 * 6/2011 Yamazaki ...................... 310/300

FOREIGN PATENT DOCUMENTS

| JP | 2003-270555 | 9/2003 |
| JP | 2004-181552 | 7/2004 |
| JP | 2009-105031 | 5/2009 |
| WO | 2005/059933 | 6/2005 |

OTHER PUBLICATIONS

Machine translation of JP2004181552.*
Bezooijen, et al. A GMS/EDGE/WCDMA Adaptive Series-LC Matching Network Using RF-MEMS Switches, IEEE J. Solid-State Circuits, vol. 43, No. 10, pp. 2259-2268, Oct. 2008.
Japanese Office Action for Japanese Application No. 2009-214807 mailed on Jan. 31, 2012.

* cited by examiner

*Primary Examiner* — David M Sinclair
(74) *Attorney, Agent, or Firm* — White & Case LLP

(57) ABSTRACT

According to one embodiment, a MEMS device includes an electrode on a substrate, a movable structure which is supported in midair above the electrode by first and second anchor portions on the substrate, and moves toward the electrode, a first spring structure which connects the first anchor portion to the movable structure and uses a ductile material, and a second spring structure which connects the second anchor portion to the movable structure and uses a brittle material.

22 Claims, 21 Drawing Sheets

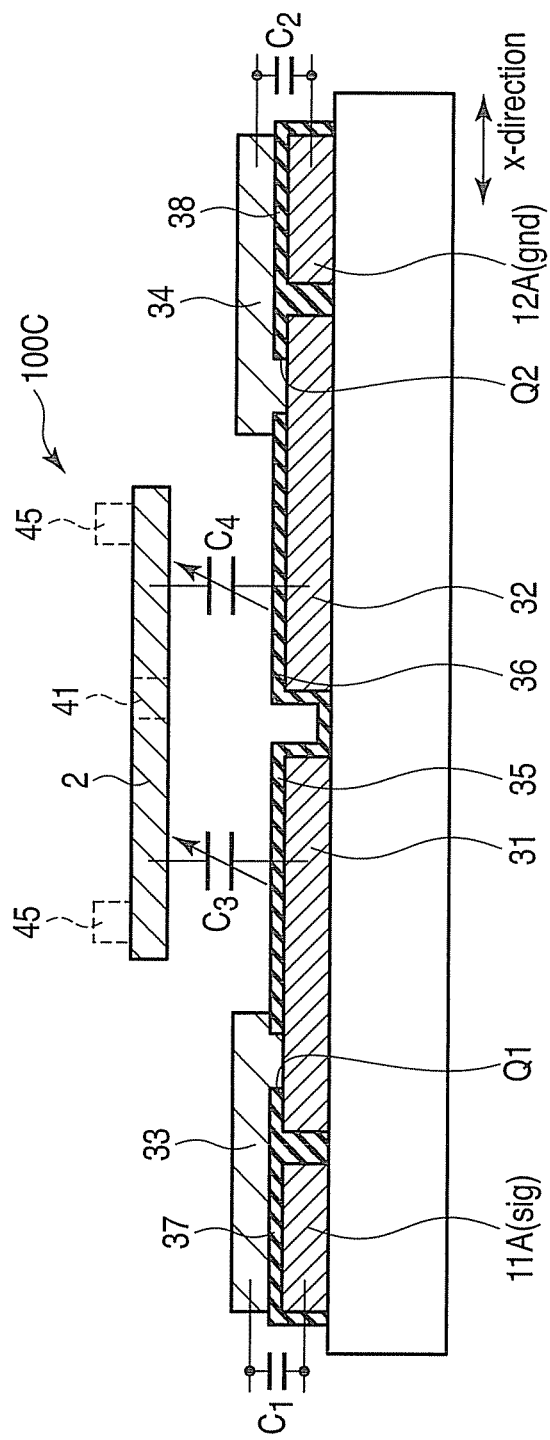
F I G. 7A

Up-state

Up-state

Down-state

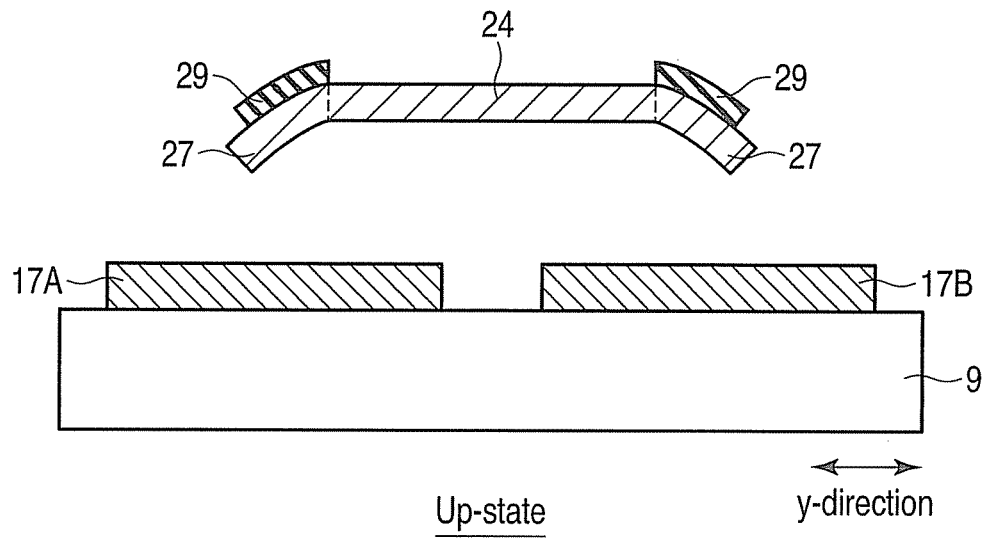
F I G. 16A
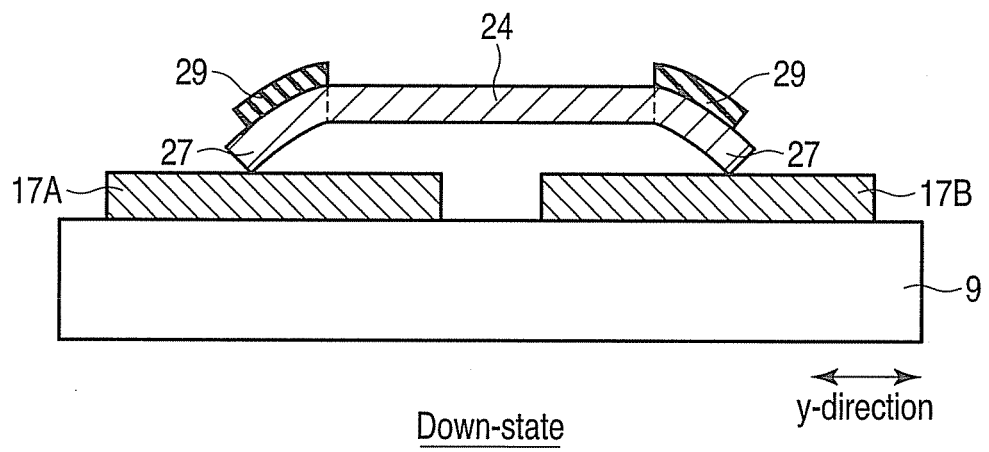
F I G. 16B

MEMS DEVICE HAVING A MOVABLE STRUCTURE

CROSS-REFERENCE TO RELATED APPLICATIONS

This application is based upon and claims the benefit of priority from Japanese Patent Application No. 2009-214807, filed Sep. 16, 2009; the entire contents of which are incorporated herein by reference.

FIELD

Embodiments described herein relate generally to a MEMS device.

BACKGROUND

Since a device in which a micro-electromechanical system (MEMS) is applied to a variable capacitance element (which will be referred to as a MEMS variable capacitance device hereinafter) can realize low loss, high isolation and high linearity, it is expected as a key device that realizes multiband and multimode of next-generation mobile terminals.

The reason why the MEMS variable capacitance device can realize the low loss is that a metal material having a low resistivity is used for a capacitive electrode of the variable capacitance element which is a movable portion. Specifically, aluminum (Al) or gold (Au) is used for the capacitive electrode. Such a metal material generally shows ductibility characteristics.

Therefore, there is a problem that, when the movable capacitive electrode is repeatedly driven, creep (change in shape due to stress) of a member constituting the movable portion causes skew of the shape of the movable portion.

In the case of the MEMS variable capacitance device, when an electrode as a movable portion changes due to creep, an interval between two electrodes of a capacitive electrode changes from a predetermined interval. Therefore, when the MEMS variable capacitance device is used over a long period, a capacitance value of the variable capacitance element varies from a designed value.

Further, in a switch to which the MEMS is applied, isolation characteristics of a contact portion of the switch deteriorate.

As one of means for avoiding creep, a hard metal material that has small plastic deformation and shows brittleness characteristics like an aluminum-titanium (Al—Ti) alloy or tungsten (W) is used for the movable portion. However, such a metal material has a higher resistivity than Al or Au, and hence the loss increases.

Furthermore, as another means, a structure in which a metal material as a ductile material and an insulator as a brittle material are laminated is adopted for the movable portion (see, e.g., U.S. Pat. No. 7,299,538). However, in this laminated structure, the movable portion is apt to warp due to a difference in internal stress between the ductile material and the brittle material, and as a result, the deformation of the movable portion occurs.

BRIEF DESCRIPTION OF THE DRAWINGS

FIG. 7A is a cross-sectional view showing a structural example of the MEMS device according to the first embodiment;

FIGS. 16A and 16B are views for explaining an operation of the MEMS device according to the second embodiment.

DETAILED DESCRIPTION

Figure 1:
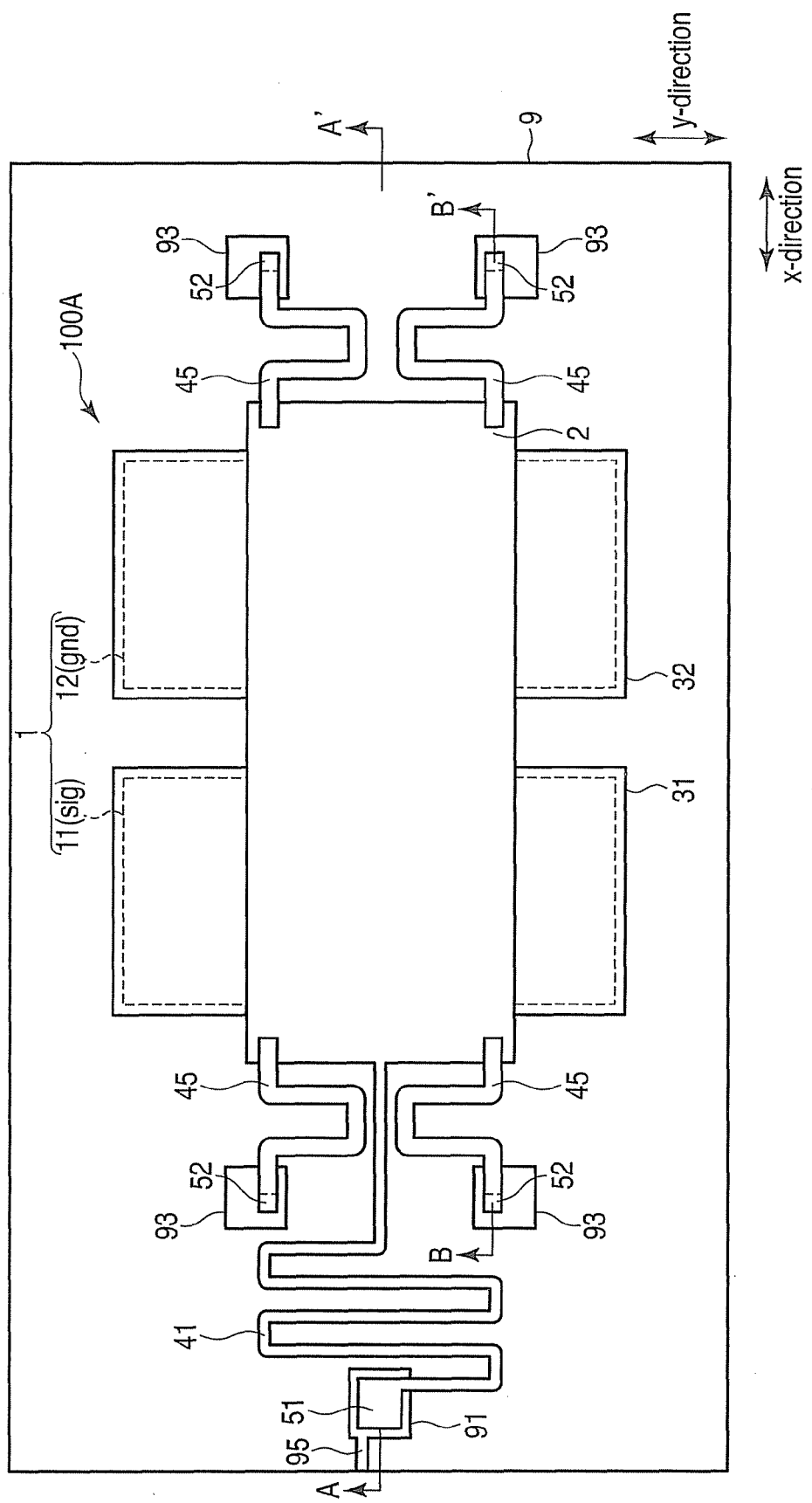
FIG. 1 is a plan view showing a structural example of a MEMS device according to a first embodiment.

Embodiments will now be described in detail with reference to the drawings. In the following description, like reference numerals denote elements having the same functions and structures, and tautological explanation will be given as required.

In general, according to one embodiment, a MEMS devise includes an electrode on a substrate; a movable structure which is supported in midair above the electrode by first and second anchor portions on the substrate, and moves toward the electrode; a first spring structure which connects the first anchor portion to the movable structure and uses a ductile material; and a second spring structure which connects the second anchor portion to the movable structure and uses a brittle material.

EMBODIMENTS

(A) First Embodiment

A MEMS device according to a first embodiment will now be described with reference to FIGS. 1 to 11 while taking a MEMS variable capacitance element as an example.

(A-1) Structural Example 1

The MEMS device (MEMS variable capacitance device) according to Structural Example 1 of the first embodiment will now be described with reference to FIGS. 1 to 3D.

(a) Structure

Figure 2A:
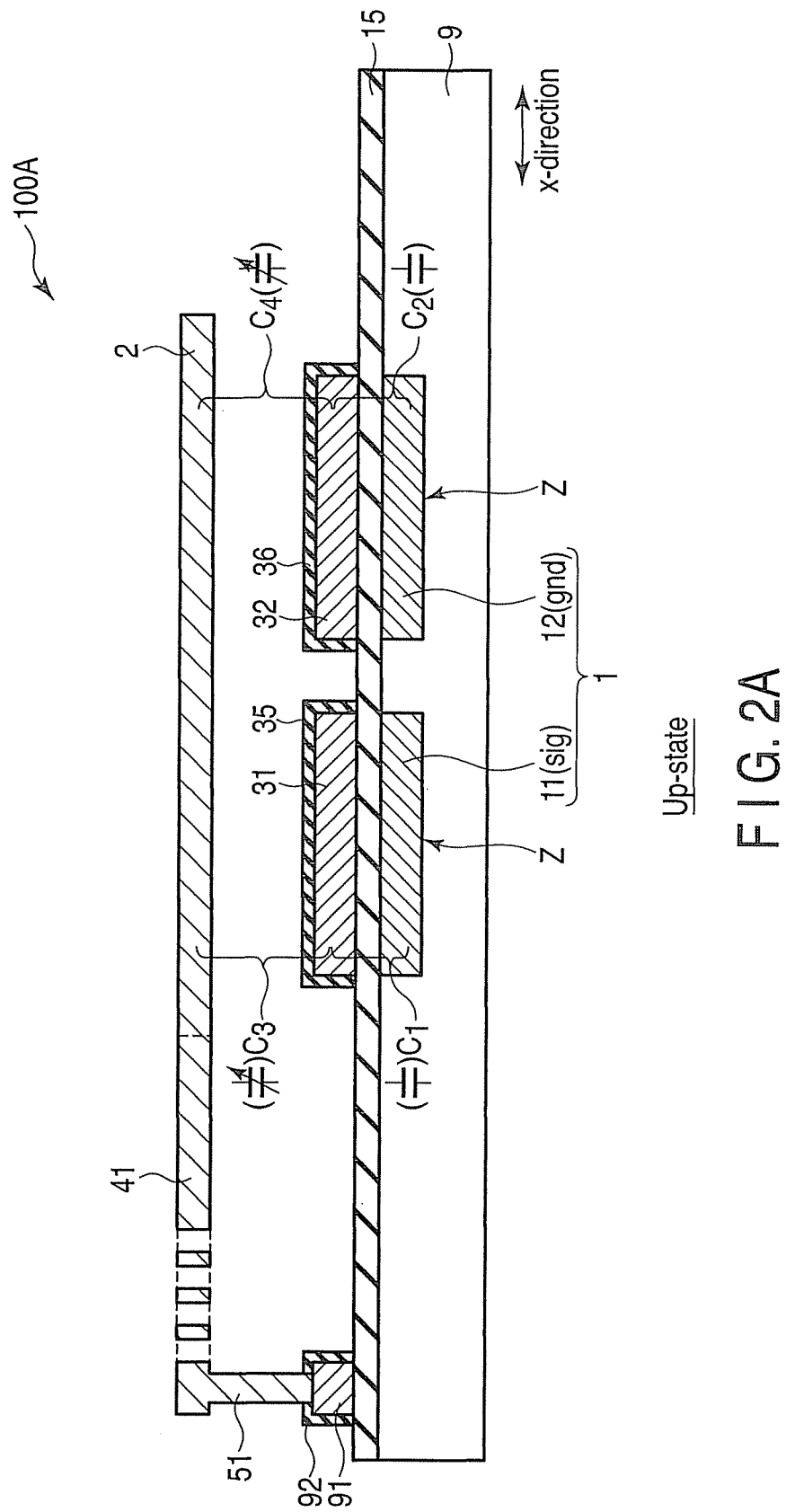
FIGS. 2A and 2B are cross-sectional views showing a structural example of the MEMS device according to the first embodiment.
Figure 2B:
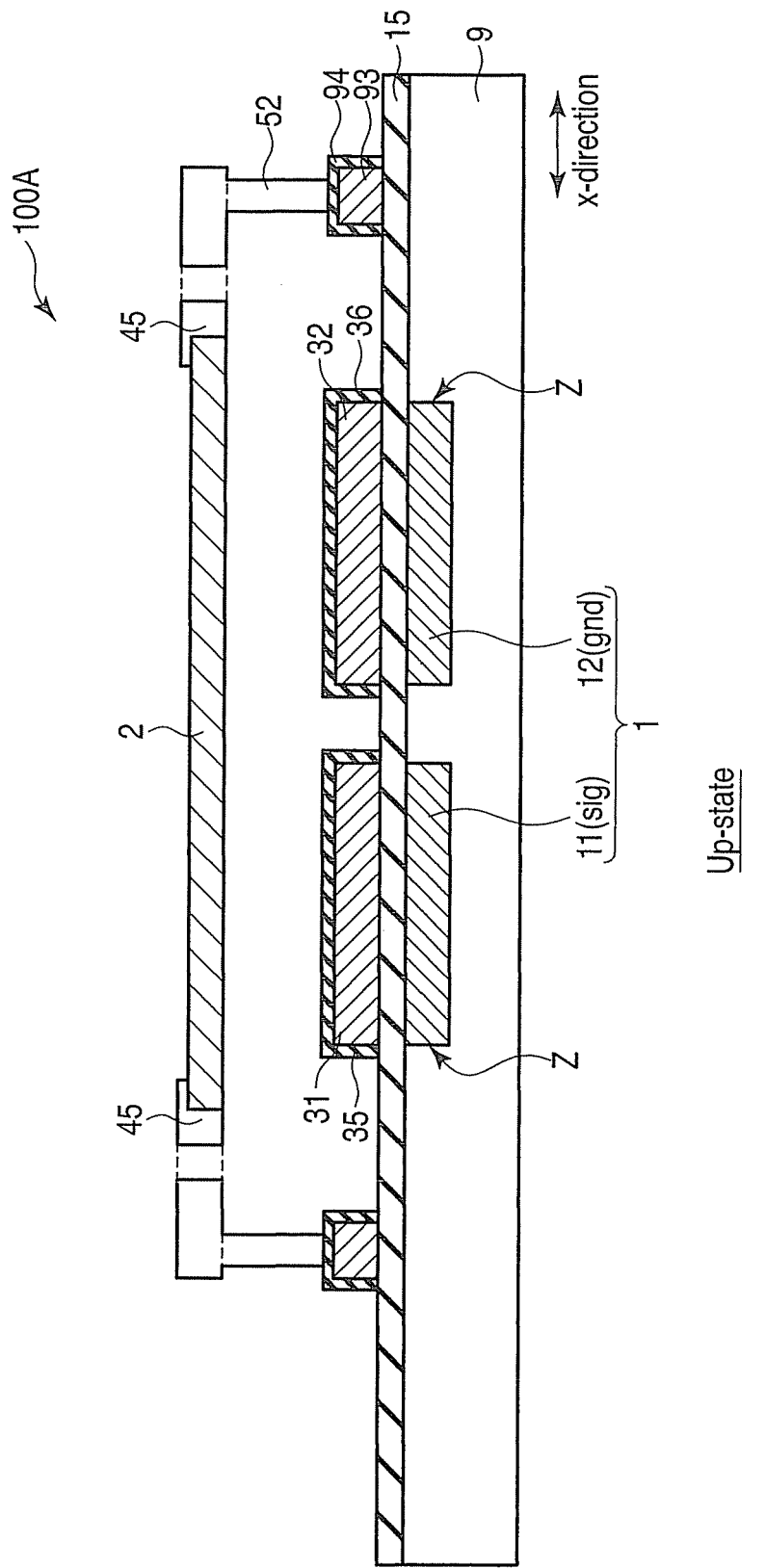

A structure of the MEMS variable capacitance device according to Structural Example 1 of the first embodiment will now be described with reference to FIGS. 1, 2A and 2B. FIG. 1 shows a planar structure of the MEMS variable capacitance device according to this structural example. Further, FIGS. 2A and 2B show a cross-sectional structure of the MEMS variable capacitance device according to this structural example. FIG. 2A shows a cross-sectional structure taken along line A-A' in FIG. 1, and FIG. 2B shows a cross-sectional structure taken along line B-B' in FIG. 1.

As shown in FIGS. 1, 2A and 2B, a MEMS variable capacitance device 100A according to Structural Example 1 is provided on a substrate 9. The substrate 9 is, e.g., an interlayer insulating film provided on a silicon substrate or an insulative substrate formed of glass.

When the interlayer insulating film on the silicon substrate is used for the substrate 9, elements such as a field-effect transistor may be provided in a surface region (semiconductor region) of a silicon substrate. Such elements constitute a logic circuit or a memory circuit. The interlayer insulating film is provided on the silicon substrate to cover such circuits. Therefore, the MEMS variable capacitance device is provided above these circuits on the silicon substrate. It should be noted that preventing a circuit serving as a noise generation source such as an oscillator from being arranged below the MEMS variable capacitance device 100A is preferable. It should be noted that a shield metal may be provided in the interlayer insulating film to suppress noise from circuits in a lower layer from being propagated to the MEMS variable capacitance device 100A.

Furthermore, it is desirable to use a material having a low dielectric constant for the interlayer insulating film on the silicon substrate to reduce a parasitic capacitance thereof. For example, a TetraEthylOrthoSilicate (TEOS) is used for the interlayer insulating film. Moreover, to reduce the parasitic capacitance, a larger film thickness of the interlayer insulating film is desirable, and it is preferable for the film thickness of the interlayer insulating film as the substrate 9 to be, e.g., not smaller than 10 μm.

The MEMS variable capacitance device 100A includes, e.g., a lower capacitive electrode (lower electrode) 1 and an upper capacitive electrode (an upper electrode) 2. The lower capacitive electrode 1 and the upper capacitive electrode 2 form one variable capacitance element.

In this structural example, the lower capacitive electrode 1 is formed of a signal electrode (first lower electrode 11) and a ground electrode (second lower electrode) 12. The signal electrode 11 and the ground electrode 12 form one pair, and a potential difference between the two electrodes 11 and 12 is treated as an output (RF power/RF voltage) from the MEMS variable capacitance device 100A. The potential on the signal electrode 11 is variable, and the potential on the ground electrode 12 is set to, e.g., a fixed potential (e.g., ground potential).

The signal electrode 11 and the ground electrode 12 are buried in, e.g., a groove Z in a substrate 9 and fixed in the substrate 9. The signal electrode 11 and the ground electrode 12 extend in, e.g., the y-direction.

A metal such as aluminum (Al), copper (Cu) or gold (Au) or an alloy containing at least one selected from these metals is used for the signal electrode 11 and the ground electrode 12.

An insulating film 15 is provided on upper surfaces of the signal electrode 11 and the ground electrode 12.

An upper capacitive electrode 2 is provided above the signal electrode 11 and the ground electrode 12. The upper capacitive electrode 2 is supported in midair (in the air) by anchor portions 51 and 52 through a plurality of spring structures 41 and 45, for example. The upper capacitive electrode 2 is movable and moves in the up-and-down direction (vertical direction) with respect to a surface of the substrate 9. The upper capacitive electrode 2 has, e.g., a square planar shape and extends in the x-direction. It should be noted that the upper capacitive electrode 2 may have an opening portion (through-hole) pierced from an upper surface toward a bottom surface thereof.

For example, aluminum (Al), an alloy containing aluminum as a main component, or a metal such as copper (Cu), gold (Au) or platinum (Pt) is used for the upper capacitive electrode 2.

First and second lower drive electrodes (drive electrodes) 31 and 32 are provided between the lower capacitive electrodes 11 and 12 and the upper capacitive electrode 2. An air gap (cavity) is provided between the upper capacitive electrode 2 and the lower drive electrodes 31 and 32.

The lower drive electrodes 31 and 32 are stacked on the lower capacitive electrodes 11 and 12 through the insulating film 15. More specifically, the first lower drive electrode 31 is stacked on the signal electrode 11 via the insulating film 15. The second lower drive electrode 32 is stacked on the ground electrode 12 via the insulating film 15. It should be noted that the lower driver electrodes 31 and 32 may be stacked on the signal electrode 11 and the ground electrode 12 provided on the upper surface of the substrate 9 through the insulating film 15.

Each of the lower drive electrodes 31 and 32 has a square planar shape and extends in, e.g., the y-direction. Surfaces of the lower drive electrodes 31 and 32 are covered with, e.g., insulating films 35 and 36. The lower drive electrodes 31 and 32 are fixed to the upper side of the insulating film 15.

It should be noted that, in this illustrated structural example, dimensions of the lower drive electrodes 31 and 32 in the x- and y-directions are equal to dimensions of the lower signal electrodes 11 and 12, but the present example is not restricted thereto. For example, the dimensions of the lower drive electrodes 31 and 32 in the x-direction may be larger than the dimensions of the lower signal electrodes 11 and 12 in the x-direction, or the dimensions of the lower drive electrodes 31 and 32 in the y-direction may be smaller than the dimensions of the lower signal electrodes 11 and 12 in the y-direction.

For example, Al, an alloy containing Al as a main component or a metal such as Cu is used for the lower drive electrodes 31 and 32. Further, an insulator such as a silicon oxide film, a silicon nitride film or a high-dielectric (High-k) film is used for the insulating films 35 and 36.

As described above, the upper electrode 2 and the lower capacitive electrodes 11 and 12 form the variable capacitance element. Moreover, in this structural example, the upper electrode 2 also functions as a drive electrode forming a pair with the two lower drive electrodes 31 and 32. That is, in the MEMS variable capacitance device 100A according to this structural example, the upper electrode 2 and the two lower drive electrodes 31 and 32 form an actuator. The movable upper electrode 2 included in the MEMS variable capacitance device 100A will be referred to as an upper capacitive/drive electrode 2 hereinafter. Additionally, like this structural example, a structure that the lower drive electrodes 31 and 32 are stacked on the lower capacitive electrodes 11 and 12 through the insulating film 15 will be referred to as a stacked electrode structure.

The lower capacitive electrode 11 or 12 and the lower drive electrode 31 or 32 stacked in the MEMS variable capacitance device 100A according to this structural example form a fixed capacitive element having a metal-insulator-metal (MIM) structure (which will be referred to as an MIM capacitive element hereinafter). The MIM capacitive element has a predetermined capacitance $C_1$ or $C_2$ in accordance with an opposed area between the stacked electrodes, an interval between the stacked electrodes (film thickness of the insulator film 15) and a dielectric constant of the insulating film. Further, a capacitive coupling having a variable capacitance $C_3$ or $C_4$ is present between the lower drive electrode 31 or 32 and the upper capacitive/drive electrode 2. It should be noted that capacitance $C_1$ and capacitance $C_2$ may be equal to or different from each other. Likewise, the upper limit value/lower limit value of capacitance $C_3$ and the upper limit value/lower limit value of capacitance $C_4$ may be equal to or different from each other.

The capacitance between the signal electrode 11 and the ground electrode 12 is determined based on the capacitances $C_1$ to $C_4$ connected in series between the signal electrode 11 and the ground electrode 12.

The capacitances $C_1$ to $C_4$ connected in series between the signal electrode 11 and the ground electrode 12 are utilized as a variable capacitance of the MEMS drive, i.e., a variable capacitance required to generate an output. It should be noted that, in addition to the capacitances $C_1$ to $C_4$ connected in series, a parasitic capacitance produced between the signal electrode 11 and the ground electrode 12 may be of course further included in the capacitance between the signal electrode 11 and the ground electrode 12.

In the MEMS variable capacitance device 100A according to this structural example, electrostatic attractive force is produced by providing a potential difference between the upper capacitive/drive electrode 2 and the lower drive electrodes 31 and 32. Based on the electrostatic attractive force produced between the upper capacitive/drive electrode 2 and the lower drive electrodes 31 and 32, the upper capacitive/drive electrode 2 moves in the vertical direction (up-and-down direction) with respect to the substrate surface (lower drive electrode), and an interval between the upper capacitive/drive electrode 2 and the lower capacitive electrodes 11 and 12 fluctuates. A capacitance value (capacitance) of the MEMS variable capacitance device 100A changes due to a fluctuation in inter-electrode distance. With this change, the potential on the capacitive electrode (signal electrode 11 in this example) is displaced, and a radio-frequency (RF) signal is output from the capacitive electrode (signal/ground electrode).

Like this structural example, the manufacturing method of the MEMS variable capacitance device 100A having a configuration that the movable upper electrode functions as the capacitive electrode and the drive electrode is simpler than that of a MEMS variable capacitance device having a configuration that an upper capacitive electrode and an upper drive electrode are independent from each other, and the MEMS variable capacitance device is structurally robust.

As described above, in the MEMS variable capacitance device 100A according to this structural example, a plurality of spring structures 41 and 45 are connected to the movable upper electrode 2 supported in midair. Different materials are used for the plurality of spring structures 41 and 45. The MEMS variable capacitance device 100A according to this structural example includes the first and second spring structures 41 and 45, and different materials are used for these structures.

One end of the first spring structure 41 is connected to one end of the upper capacitive/drive electrode 2 in the x-direction. The first spring structure 41 is integrally formed with, e.g., the upper capacitive/drive electrode 2 to provide a single-layer structure that the upper capacitive/drive electrode 2 is connected to the first spring structure 41 as one. The first spring structure 41 has, e.g., a meander planar shape.

The anchor portion 51 is connected to the other end of the first spring structure 41. The anchor portion 51 is provided on, e.g., an interconnect 91. The interconnect 91 is provided on the insulating film 15 that covers the surface of the substrate 9. A surface of the interconnect 91 is covered with an insulating film 92. An opening portion is provided in the insulating film 92. The anchor portion 51 directly comes into contact with the interconnect 91 through this opening portion.

The first spring structure 41 is formed of, e.g., a ductile material having conductivity, and the same material as the upper capacitive/drive electrode 2 is used. The ductile material means a material that a member formed of this material is plastically deformed (stretched) and then destroyed when a stress is given to this member to be destroyed.

For example, Al, an alloy containing Al as a main component or a metal such as Cu, Au or Pt is used for the first spring structure 41. The anchor portion 51 is constituted of, e.g., a conductor and formed of the same material as the spring structure 41. However, a material different from the upper capacitive/drive electrode 2 and the spring structure 41 may be used for the anchor portion 51. The first spring structure 41 may include a plurality of materials and/or members so long as the first spring structure 41 demonstrate a ductile property as a whole.

A potential (voltage) is applied to the upper capacitive/drive electrode 2 through the first spring structure 41, the anchor portion 52 and the interconnect 91.

Moreover, the second spring structure 45 is connected to each of four corners of the square upper capacitive/drive electrode 2. It should be noted that the four second spring structures 45 are provided in this structural example, the number is not restricted to this value. One end of the second spring structure 45 is provided on the upper capacitive/drive electrode 2. Therefore, a joint portion of the second spring structure 45 and the upper capacitive/drive electrode 2 has a laminated structure. The other end of the second spring structure 41 is connected to the anchor portion 52. The anchor portion 52 is provided on dummy layers 93 and 94. The dummy layers 93 and 94 are provided on the insulating film 15 that covers the surface of the substrate 9.

The second spring structure 45 is formed of a material different from that of the first spring structure 41. As the material used for the second spring structure 45, for example, a brittle material is used. The brittle material means a material that a member formed of this material is destroyed with almost no plastic deformation (change in shape) when a stress is given to this member to be destroyed. In general, energy (stress) required to destroy a member using the brittle material is smaller than energy required to destroy a member using the ductile material. That is, a member using the brittle material is apt to be destroyed as compared with a member using the ductile material.

As the brittle material used for the second spring structure 45, for example, a material having insulation properties like a silicon oxide or a silicon nitride may be used, or a semiconductor material such as polysilicon (poly-Si), silicon (Si) or silicon germanium (SiGe) or a material having conductivity like tungsten (W), molybdenum (Mo) or an aluminum-titanium (Al—Ti) alloy may be utilized. It should be noted that the Al—Ti alloy may contain any other element in addition to Al and Ti. Additionally, in this structural example, a brittle material other than those described above may be used for the second spring structure 45. The second spring structure 45 may include a plurality of materials and/or members so long as the second spring structure 45 demonstrate a brittle property as a whole.

It should be noted that, as a material used for the anchor portion 52, the same material as the second spring structure 45 (e.g., a brittle material) may be adopted, or the same material as the anchor portion 51 (e.g., a ductile material) may be utilized. For example, the same material as the lower drive electrodes 31 and 32 is used for the interconnect 91 and the dummy layer 93, and a film thickness of each of the interconnect 91 and the dummy layer 93 is equal to that of each of the lower drive electrodes 31 and 32. Further, the same material as the insulating films 35 and 36 covering the lower drive electrodes 31 and 32 is used for the insulating films 92 and the dummy layer 94 covering the interconnect 91 and the dummy layer 93, respectively, and a film thickness of each of the insulating films 92 and the dummy layer 94 is equal to a film thickness of each of the insulating films 35 and 36.

A spring constant k2 of the spring structure 45 using the brittle material becomes larger than a spring constant k1 of the spring structure 41 using the ductile material by appropriately setting at least one selected from, e.g., a line width of the spring structure 45, a film thickness of the spring structure 45 and a flexure of the spring structure 45.

Like Structural Example 1 according to this embodiment, when the spring structures 41 and 45 using the ductile and brittle materials are connected to the movable upper electrode 2, an interval between the capacitive electrodes in a state that the upper capacitive electrode 2 is pulled upward (which will be referred to as an up-state hereinafter) is substantially determined by the spring constant k2 of the spring structure 45 using the brittle material.

Creep hardly occurs in the spring structure 45 using the brittle material. Therefore, a fluctuation in interval between the capacitive electrodes in the up-state is small even though driving of the MEMS variable capacitance device 100A is repeated more than once. It should be noted that creep of a material means a phenomenon wherein skew of a given member (change in shape) increases due to age or when stress is applied to the member.

Creep occurs in the spring structure 41 using the ductile material due to driving performed more than once. However, the spring constant k1 of the spring structure 41 is set to be smaller than the spring constant k2 of the spring structure 45 using the brittle material. Therefore, a change in shape (skew) of the spring structure 41 using the ductile material does not greatly affect the interval between the capacitive electrodes in the up-state.

Accordingly, in Structural Example 1 according to this embodiment, a ductile material having conductivity can be used for the movable upper electrode (movable structure) 2. That is, since a material having a low resistivity can be used for the movable upper electrode 2 without considering creep, loses in the MEMS device (MEMS variable capacitance device in this example) can be reduced.

Furthermore, in Structural Example 1 according to this embodiment, when the spring structure 41 using the ductile material and spring structure 45 using the brittle material are connected to the movable upper electrode 2, the influence of creep on the movable upper electrode 2 can be suppressed without laminating a member formed of a different material (e.g., a brittle material) on the upper electrode 2 formed of the ductile material. Therefore, a material formed of the brittle material does not have to be laminated on the upper electrode 2, and the shape of the upper electrode 2 is not skewed due to a difference in internal stress between the upper electrode 2 and the member laminated on the upper electrode 2.

As described above, in the MEMS variable capacitance device as the structural example according to this embodiment, when the movable upper electrode 2 is supported in midair by the spring structure 41 using the ductile material and the spring structures 45 using the brittle material, creep of the upper electrode can be suppressed while maintaining an advantage that losses are small.

Therefore, according to the first embodiment, the MEMS device in which deterioration of characteristics due to creep can be suppressed can be realized.

(b) Operation

An operation of the MEMS device (MEMS variable capacitance device) 100A according to Structural Example 1 of this embodiment will now be described with reference to FIGS. 2A and 2C.

The MEMS variable capacitance device 100A according to Structural Example 1 is, e.g., an electrostatic drive type MEMS device. FIG. 2C shows a connecting relationship between the respective electrodes 2, 31 and 32, low-pass filters 7a to 7c, and potential application circuits 8a to 8c in the MEMS variable capacitance device 100A according to this Structural Example 1. Furthermore, FIGS. 2A and 2C show different states when driving the MEMS variable capacitance device 100A.

Figure 2C:
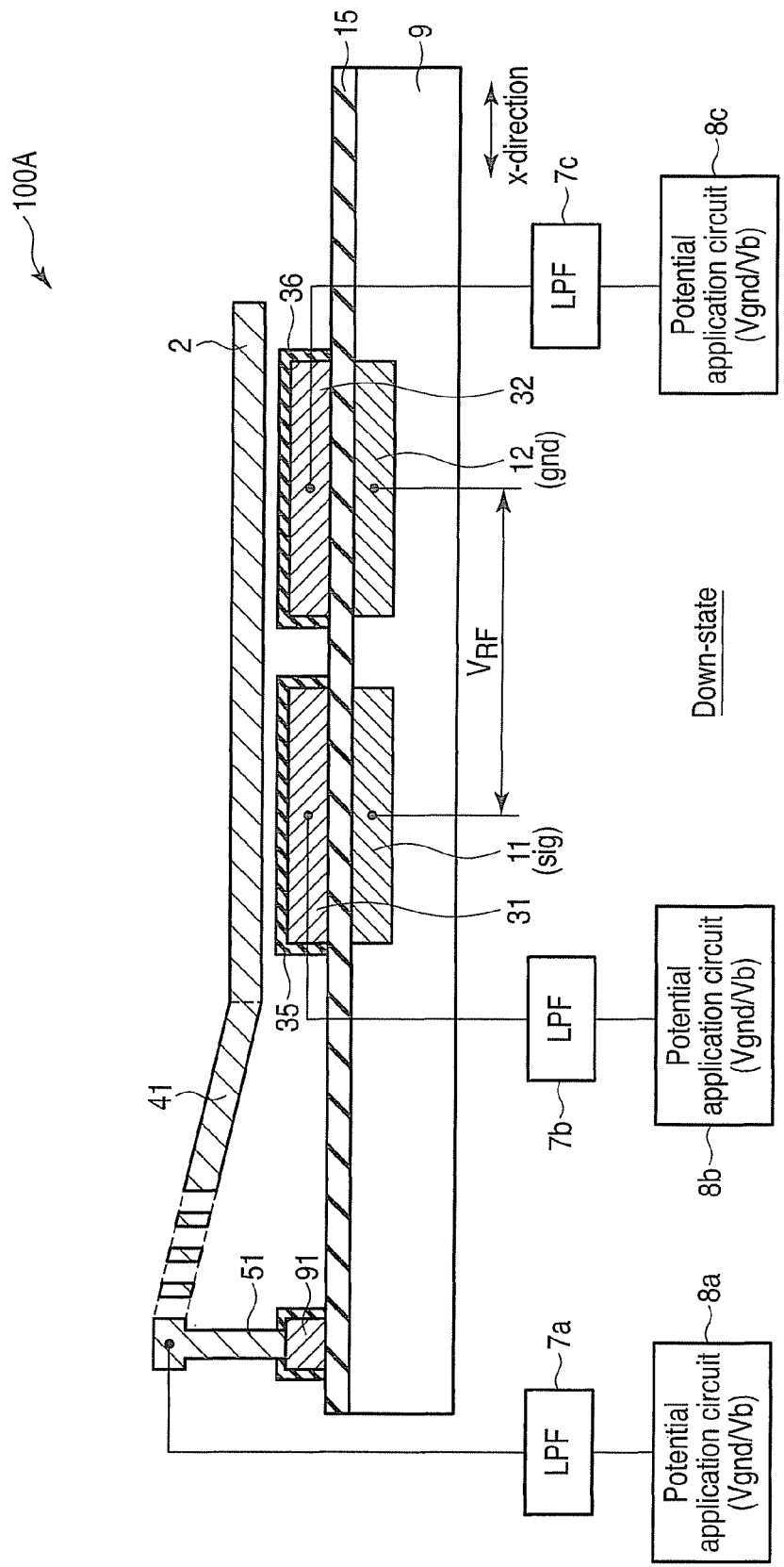
FIG. 2C is a view for explaining an operation of the MEMS device according to the first embodiment.

As shown in FIG. 2C, potential application circuit 8a is connected to the upper capacitive/drive electrode 2 via low-pass filter 7a. Potential application circuit 8b is connected to the first lower drive electrode 31 via low-pass filter 7b. Potential application circuit 8c is connected to the second lower drive electrode 32 through low-pass filter 7c. In the example depicted in FIG. 2C, the two lower drive electrodes 31 and 32 are connected to the respective different potential application circuits 8b and 8c. However, in this structural example, the two lower drive electrodes 31 and 32 may share one potential application circuit as long as they are connected to the respective different low-pass filters 7b and 7c.

Each of potential application circuits 8a to 8c includes, e.g., a booster circuit. Each of potential application circuits 8a to 8c boosts an externally input voltage by using the booster circuit and outputs an application potential. The application potential is input to the low-pass filter 7. The application potential is a bias potential Vb or ground potential Vgnd.

The low-pass filter 7 blocks a frequency component higher than a cutoff frequency included in an input signal (application potential) and allows a frequency component equal to or below the cutoff frequency included in the input signal to pass therethrough. The bias potential Vb or ground potential Vgnd having passed through the low-pass filter 7 is applied to the upper capacitive/drive electrode 2 and the lower drive electrodes 31 and 32.

The cutoff frequency of the low-pass filter 7 is obtained by an inverse number of a time constant acquired from a resistance value of the resistance element and a capacitance value of a fixed capacitive element constituting the low-pass filter 7. For example, in the low-pass filter constituted of the resistance element and the fixed capacitive element, when the cutoff frequency of the low-pass filter is 0.7 MHz, a resistance value of the resistance element and a capacitive value of the capacitive element are set in such a manner that a time constant acquired from the resistance value and the capacitance value becomes an inverse number of 0.7 MHz.

Low-pass filter 7a, 7b or 7c sets the output potential of low-pass filter 7a, 7b or 7c to one having a frequency component lower than that (frequency band) of the application potential; in other words, a potential of a relatively direct current component with respect to the application potential. When low-pass filters 7a to 7c are inserted between potential application circuits 8*a* to 8*c* and the respective electrodes 2, 31 and 32 to which the potentials are applied in this manner, noise (high-frequency component) generated from potential application circuits 8*a* to 8*c* is prevented from being propagated through the MEMS variable capacitance device 100A, especially an RF output unit (capacitive electrodes 1 and 2).

For example, when the cutoff frequency of low-pass filters 7*a* to 7*c* is set to 0.7 MHz, the noise is reduced at a rate of −20 dB/decade by low-pass filters 7*a* to 7*c*. Therefore, in the MEMS variable capacitance device 100A used in a frequency band of, e.g., 700 MHz or above, the propagation of noise with respect to the MEMS variable capacitance device 100A can be suppressed to −60 dB.

Moreover, when an oscillator frequency of the MEMS variable capacitance device in a state that the electrodes are held (hold state [up-state]) is set to 0.7 MHz, the noise is reduced at a rate of −20 dB/decade. Therefore, in the MEMS variable capacitance device 100A used in a frequency band of, e.g., 700 MHz or above, the propagation of noise with respect to the MEMS variable capacitance device 100A can be suppressed to −60 dB.

When the cutoff frequency of each low-pass filter is set to 0.7 MHz and the oscillator frequency of the MEMS variable capacitance device in the hold state is set to 0.7 MHz, the propagation of noise with respect to the MEMS variable capacitance device from potential application circuits 8*a* to 8*c* can be suppressed to −120 dB by the insertion of low-pass filters 7*a* to 7*c*. This value (−120 dB) is sufficient to suppress the propagation of noise in many wireless systems.

As described above, the noise of the potential application circuit 8 with respect to the RF output unit can be reduced by the low-pass filter 7. The potential having the reduced noise is applied to the MEMS variable capacitance device 100A, and the MEMS variable capacitance device 100A drives by using the applied bias potential Vb (or ground potential).

When the MEMS variable capacitance device 100A according to this structural example is driven, a potential difference is provided between the upper capacitive/drive electrode 2 and the lower drive electrodes 31 and 32.

For example, when ground potential Vgnd (e.g., 0 V) is applied to the upper capacitive/drive electrode 2 and the bias potential Vb is applied to the lower drive electrodes 31 and 32, the MEMS variable capacitance device 100A is driven. In the case of moving the upper capacitive/drive electrode 2 toward the lower side, the bias potential Vb is, e.g., approximately 30 V (an absolute value).

Contrary, the MEMS variable capacitance device 1 may be driven by applying the bias potential Vb to the upper capacitive/drive electrode 2 and applying ground potential Vgnd to the lower drive electrodes 31 and 32. Additionally, the potentials applied to the upper capacitive/drive electrodes 2 and the lower drive electrodes 31 and 32, respectively, i.e., the bias potential Vb and ground potential Vgnd may be counter-changed to realize driving. It should be noted that the example is not restricted to the situation that potentials having the same magnitude/polarity are applied to both the two lower drive electrodes 31 and 32.

Electrostatic attractive force is generated between the electrodes 2, 31 and 32 due to the given potential difference.

When the upper capacitive/drive electrode 2 and the lower drive electrodes 31 and 32 have no potential difference or have a small potential difference, the upper capacitive/drive electrode 2 has moved to the upper side in the MEMS variable capacitance device 100A as depicted in FIG. 2A.

When the potential difference between the upper capacitive/drive electrode 2 and the lower drive electrodes 31 and 32 is equal to or above a given value, the movable upper capacitive/drive electrode 2 starts moving and is drawn toward the lower drive electrodes 31 and 32 due to the electrostatic attractive force produced between the upper capacitive/drive electrode 2 and the lower drive electrodes 31 and 32.

As a result, the upper capacitive/drive electrode 2 has moved toward the lower drive electrodes 31 and 32 as depicted in FIG. 2C. A potential difference that allows the movable upper capacitive/drive electrode 2 to start moving is called a pull-in voltage.

In this structural example, a state that the potential difference between the upper drive electrode 2 and the lower drive electrodes 31 and 32 is equal to or above a given value (pull-in voltage) and the upper capacitive/drive electrode 2 has been lowered toward the lower drive electrodes 31 and 32 as shown in, e.g., FIG. 2C is called a down-state. On the other hand, a state that the potential difference between the upper drive electrode 2 and the lower drive electrodes 31 and 32 is smaller than the pull-in voltage and the upper capacitive/drive electrode 2 has been moved up as depicted in, e.g., FIG. 2A is called an up-state.

The MEMS variable capacitance device 100A according to this structural example has a structure in which the lower drive electrodes 31 and 32 are stacked on the lower capacitive electrodes (signal/ground electrodes) 11 and 12. Therefore, a movement that the upper capacitive/drive electrode 2 moves down toward the lower drive electrodes 31 and 32 is the same as a movement that the upper capacitive/drive electrode 2 moves down toward the lower capacitive electrodes 11 and 12.

Accordingly, an inter-electrode distance between the upper capacitive/drive electrode 2 and the lower capacitive electrode 1 forming the variable capacitance element changes depending on the up-state of the MEMS variable capacitance device 100A and the down-state of the MEMS variable capacitance device 100B.

In the MEMS variable capacitance device 100A according to this structural example, the potential on one electrode (signal electrode) 11 of the two electrodes 11 and 12 constituting the lower capacitive electrode 1 is variable, and the potential on the other electrode (ground electrode) 12 is fixed.

When the inter-electrode distance between the upper capacitive electrode 2 and the lower capacitive electrodes 11 and 12 fluctuates, the potential in the signal electrode 11 of the two lower capacitive electrodes forming a pair changes between the down-state and the up-state. On the other hand, during the operation of the MEMS variable capacitance device 100A, the ground electrode 12 of the two lower capacitive electrodes 1 is fixed to a constant potential (e.g., ground potential), and hence the potential on the ground electrode 12 is not displaced.

The potential difference between the signal electrode 11 and the ground electrode 12 is output to the outside as an output signal (RF power or an RF voltage) $V_{RF}$ in a frequency associated with an operation cycle (up/down-state) of the MEMS variable capacitance device 100A.

As shown in FIG. 2C, low-pass filter 7*a* is inserted between the upper capacitive/drive electrode 2 and potential application circuit 8*a*. As a result, the upper signal/capacitive electrode 2 floats (floating state) in terms of radio frequencies (RF). Therefore, in the MEMS variable capacitance device 100A according to this structural example, the upper electrode 2 functions as the upper capacitive electrode forming a pair with the lower capacitive electrode 1, and it also functions as the upper drive electrode forming a pair with the lower drive electrode 31 or 32.

The MEMS variable capacitance device 100A according to this structural example has capacitances $C_1$ to $C_4$ between the respective electrodes 2, 11, 12, 31 and 32 as shown in FIG. 2A. Therefore, in the MEMS variable capacitance device 100A according to this structural example, this structure is equivalent to a circuit configuration in which the capacitances $C_1$ to $C_4$ are connected in series between a signal line (signal electrode) sig and a ground line (ground electrode) gnd. Based on this structure, a potential difference applied to the movable upper electrode 2 and electrostatic attractive force caused due to this potential difference become small in the down-state of the MEMS variable capacitance device 100A, and returning from the down-state to the up-state can be facilitated when outputting the RF voltage.

As described above, in the MEMS variable capacitance device 100A according to this structural example, the spring structure 41 using the ductile material and spring structure 45 using the brittle material are connected to the movable upper electrode 2.

The interval between the capacitive electrodes in the up-state is substantially determined by the spring constant k2 of the spring structure 45 using the brittle material. Therefore, a change in shape (skew) of the spring structure 41 using the ductile material does not greatly affect the interval between the capacitive electrodes in the up-state of the MEMS variable capacitance device 100A.

Accordingly, even if the state (up-state) depicted in FIG. 2A and the state (down-state) shown in FIG. 2C are repeated more than once to output a high frequency, the influence of creep on the upper electrode 2 becomes small.

Further, when the spring constant k2 of the spring structure 45 using the brittle material is set to be larger than the spring constant k1 of the spring structure 41 using the ductile material, the operation of returning to the up-state from the down-state becomes relatively easy.

Therefore, according to Structural Example 1 of the first embodiment, the MEMS device that suppresses the deterioration of characteristics due to creep can be realized.

(c) Manufacturing Method

A manufacturing method of the MEMS device (MEMS variable capacitance device) according to Structural Example 1 will now be described with reference to FIGS. 3A to 3D. FIGS. 3A to 3D shows a cross-sectional structure taken along line A-A' in FIG. 1 at each step in a manufacturing process of the MEMS variable capacitance device according to Structural Example 1. It should be noted that members shown in a front-side or perspective direction in the drawing are indicated by broken lines in FIGS. 3A to 3D.

Figure 3A:
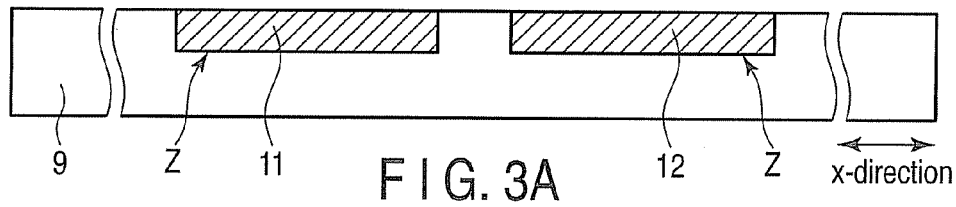
FIGS. 3A, 3B, 3C and 3D are views for explaining a manufacturing method of the MEMS device according to the first embodiment.

First, as shown in FIG. 3A, the groove Z is formed in the substrate (e.g., an insulating layer) 1 by using, e.g., a photolithography technology and an RIE (Reactive Ion Etching) method. Thereafter, a conductor is deposited on the substrate 9 and in the groove Z by using a CVD (Chemical Vapor deposition) method or a sputtering method. A metal such as aluminum (Al), copper (Cu) or gold (Au) or an alloy containing any one of these metals is used for the conductor.

Further, the upper surface of the substrate 9 is used as a stopper to execute flattening processing with respect to the conductor based on a CMP (Chemical Mechanical Polishing) method.

As a result, the lower capacitive electrodes 11 and 12 of the MEMS variable capacitance device are buried in the groove Z of the substrate 9 in a self-aligning manner. In the MEMS variable capacitance device according to this structural example, as the lower capacitive electrodes 11 and 12, two electrodes (interconnects) forming a pair are formed. Specifically, the lower capacitive electrodes are constituted of the signal electrode 11 and the ground electrode 12, and the potential on the signal electrode 11 is variable whilst the potential on the ground electrode 12 is fixed. A potential difference between the signal line 11 and the ground line 12 becomes an output (an RF voltage) from the MEMS variable capacitance element.

In this manner, the lower capacitive electrodes 11 and 12 are formed by a damascene process. It should be noted that the groove Z is formed to have a predetermined planar shape in accordance with a layout of the lower capacitive electrodes 11 and 12.

Figure 3B:
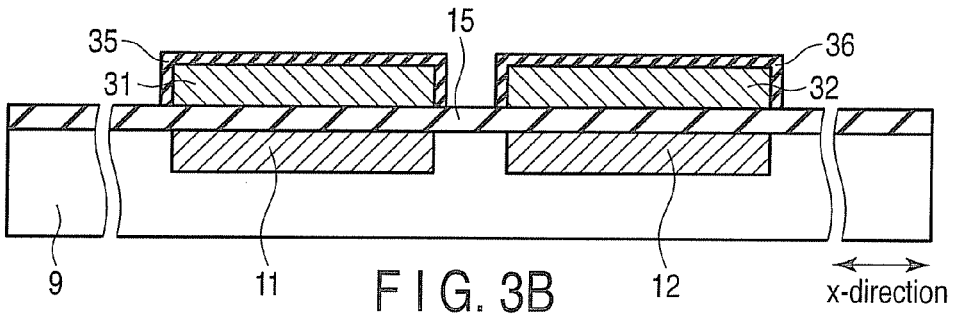

Then, as shown in FIG. 3B, the insulating film 15 is deposited on the surface of the substrate 9 and the lower capacitive electrodes 11 and 12 by using, e.g., a CVD method or a thermal oxidation method. For example, a silicon oxide is used for the insulating film 15. However, a material having a higher relative dielectric constant than a silicon oxide, e.g., a silicon nitride, an aluminum oxide or an aluminum nitride may be used.

Subsequently, the conductor is deposited on the insulating film 15 by using the CVD method or the sputtering method. Thereafter, the deposited conductor is processed by using the photolithography technology and the RIE method. As a result, the lower drive electrodes 31 and 32 of the MEMS variable capacitance element are formed at positions where they overlap the signal electrode 11 and the ground electrode 12 in the vertical direction, respectively.

It should be noted that a signal interconnect or a power supply interconnect of the MEMS device may be formed on the insulating film 15 (substrate 9) by using the same material as the lower drive electrodes 31 and 32 simultaneously with formation of the lower drive electrodes 31 and 32.

The insulating films 35 and 36 are formed on the lower drive electrodes 31 and 32 by using, e.g., the CVD method or the thermal oxidation method. For example, a silicon oxide is used for the insulating films 35 and 36. However, an insulator having a higher relative dielectric constant than a silicon oxide may be used for the insulating films 35 and 36. It should be noted that, when the insulating films 35 and 36 are deposited by using the CVD method, they are deposited on not only the surfaces of the lower drive electrodes 31 and 32 but also the insulating film 15, but these films are omitted in the drawing.

Figure 3C:
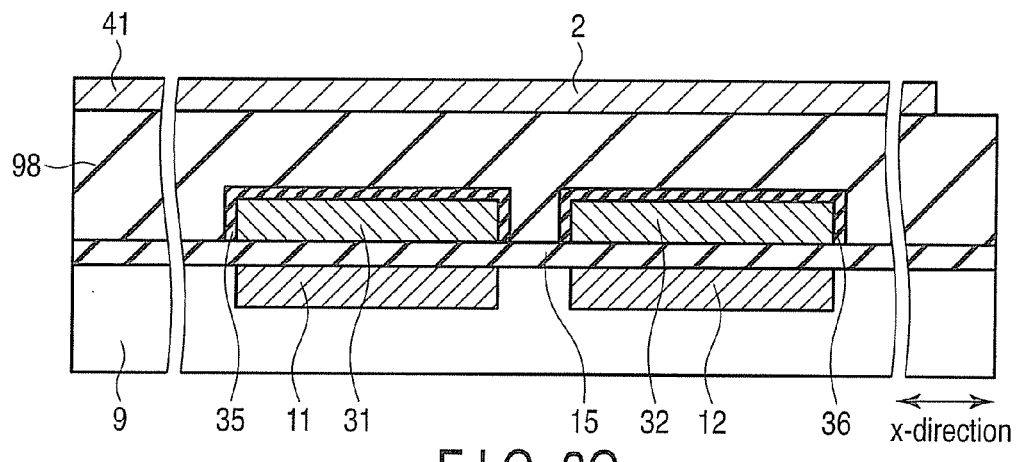

Subsequently, as shown in FIG. 3C, a sacrificial layer 98 is deposited on the insulating films 15 and 35 by using, e.g., the CVD method or a coating method. As the sacrificial layer 98, any one of an insulator, a conductor (metal), a semiconductor and an organic substance (e.g., resist) can be used as long as a large etching selectivity can be assured with respect to each material formed below the sacrificial layer 98 and a later-described material formed above the sacrificial layer 98.

Furthermore, for example, in a region where the anchor portion is formed (which will be referred to as an anchor formation region hereinafter), an opening portion in which the anchor portion should be buried is formed in the sacrificial layer 98 by using the photolithography technology and the RIE method.

Moreover, the conductor 2 is deposited on the sacrificial layer 98 by using, e.g., the CVD method or the sputtering method. It should be noted that, when the opening portion has been formed in the anchor formation region, the conductor 2 is buried in the opening portion.

The conductor 2 on the sacrificial layer 98 is processed into a predetermined shape by using, e.g., the photolithography technology and the RIE method. As a result, the upper capacitive electrode 2 of the MEMS variable capacitance device is formed. It should be noted that the upper capacitive electrode 2 also functions as an actuator drive electrode in the MEMS variable capacitance device in this structural example.

The first spring structure 41 is formed simultaneously formation of the upper capacitive/drive electrode 2. This spring structure is continuous with the upper capacitive/drive electrode 2. The ductile material, e.g., Al, an alloy containing Al as a main component, Au or Pt is used for the upper capacitive/drive electrode 2 and the first spring structure 41.

Figure 3D:
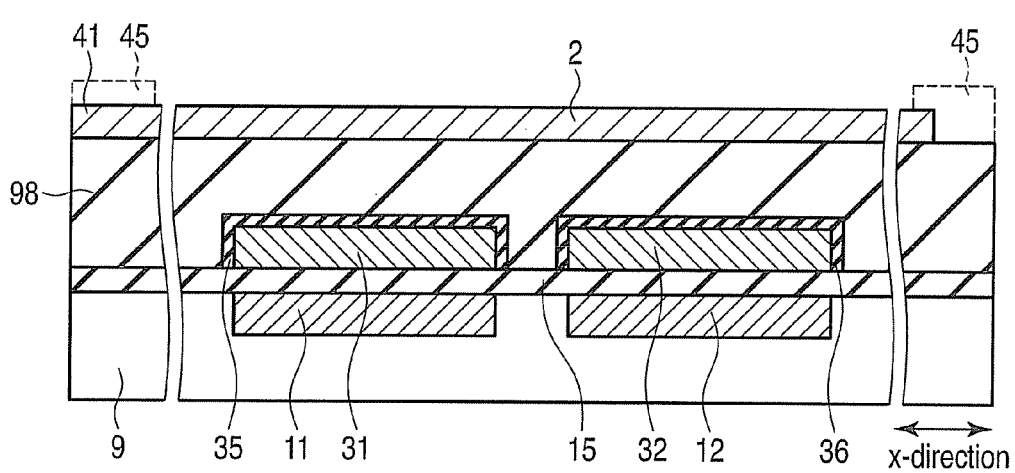

After the upper capacitive/drive electrode 2 and the first spring structure 41 are formed, the second spring structure 45 is formed on the sacrificial layer 98 and the upper capacitive/drive electrode 2 to be connected to a predetermined position on the movable upper capacitive/drive electrode 2 as shown in FIG. 3D. The brittle material is used for this spring structure 45. For example, the second spring structure 45 is formed at the following step.

After the upper capacitive/drive electrode 2 and the first spring structure 41 are formed, the opening portion is formed in the sacrificial layer 97 in the anchor formation region of the second spring structure. Moreover, the brittle material forming the second spring structure is deposited on the upper capacitive/drive electrode 2 and the sacrificial layer 98 in the opening portion of the anchor formation region of the second spring structure by using, e.g., the CVD method or the sputtering method. Here, the brittle material used for the spring structure 45 is any one of a semiconductor material such as polysilicon (poly-Si), silicon (Si) and silicon germanium (SiGe), a material having conductivity such as tungsten (W), molybdenum (Mo) or an aluminum-titanium (Al—Ti) alloy, and insulator material.

The deposited material (film) is processed into a predetermined shape by, e.g., the photolithography technology and the RIE method, thereby forming the second spring structure 45 using the brittle material. The second spring structure 45 is formed to have a predetermined film thickness or a predetermined shape in such a manner that the spring constant of the second spring structure 45 becomes higher than the spring constant of the first spring structure.

Additionally, the material deposited in the opening portion in the anchor formation region serves as the anchor portion. It should be noted that the anchor portion connected with the second spring structure 45 may be formed of the same material (e.g., the ductile material) at the same step as those of the anchor portion connected with the first spring structure 41.

Thereafter, the sacrificial layer 98 is selectively removed by using, e.g., wet etching. As a result, a cavity (an air gap) is formed between the upper capacitive/drive electrode 2 and the lower drive electrodes 31 and 32 as shown in FIG. 2A.

With the above-described steps, the MEMS device (MEMS variable capacitance device) having a configuration that the spring structure 41 using the ductile material and spring structure 45 using the brittle material are connected to the movable upper electrode (upper capacitive/drive electrode) 2 is brought to completion.

In the formed MEMS variable capacitance device, a distance between the movable upper electrode and the lower electrode is mainly determined by the spring constant of the spring structure using the brittle material in the up-state.

Therefore, according to the manufacturing process of the MEMS device depicted in FIGS. 2A and 3, the MEMS device that suppresses the deterioration of characteristics due to creep can be provided.

(A-2) Structural Example 2

Figure 4:
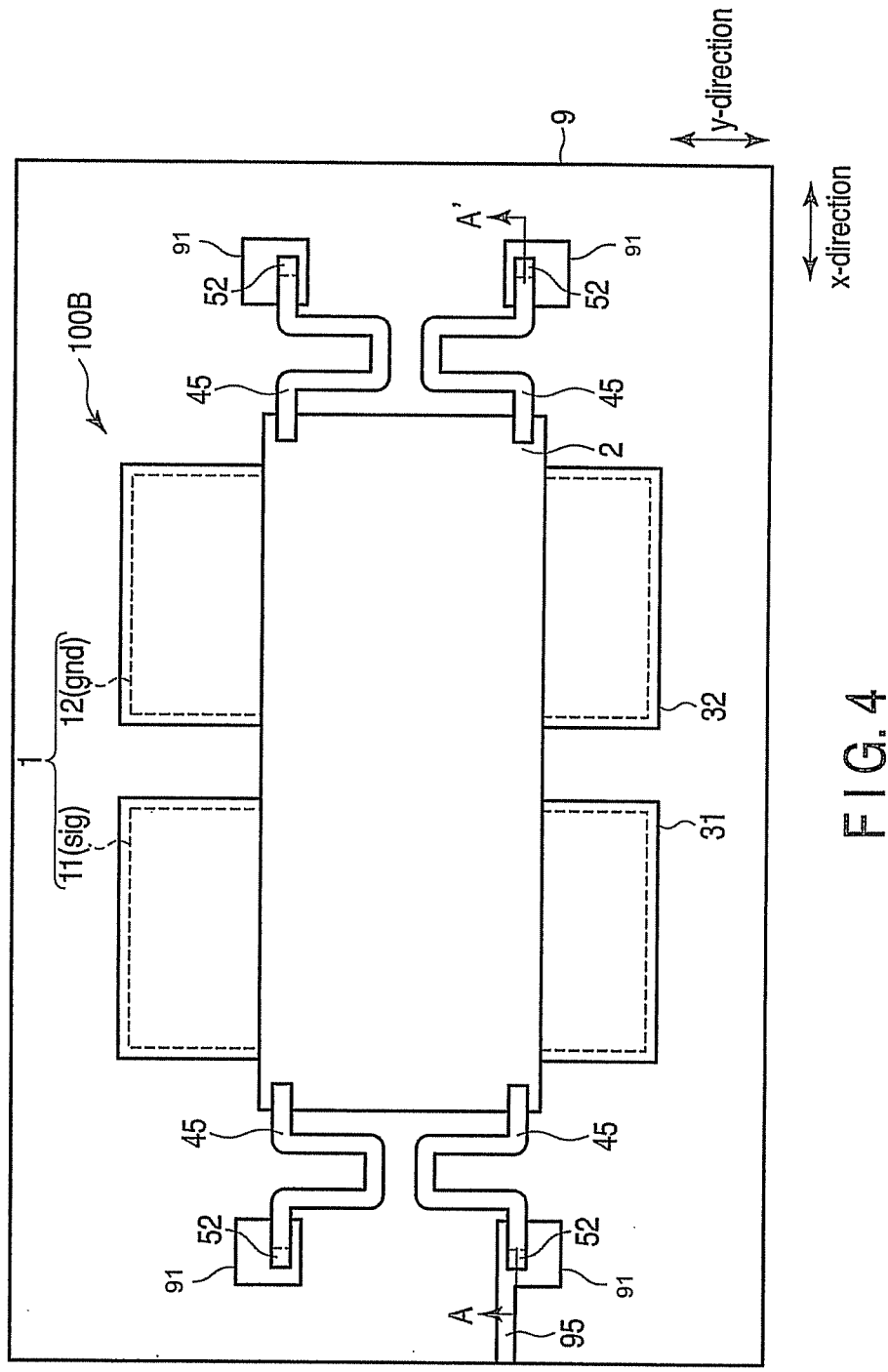
FIG. 4 is a plan view showing a structural example of the MEMS device according to the first embodiment.
Figure 5:
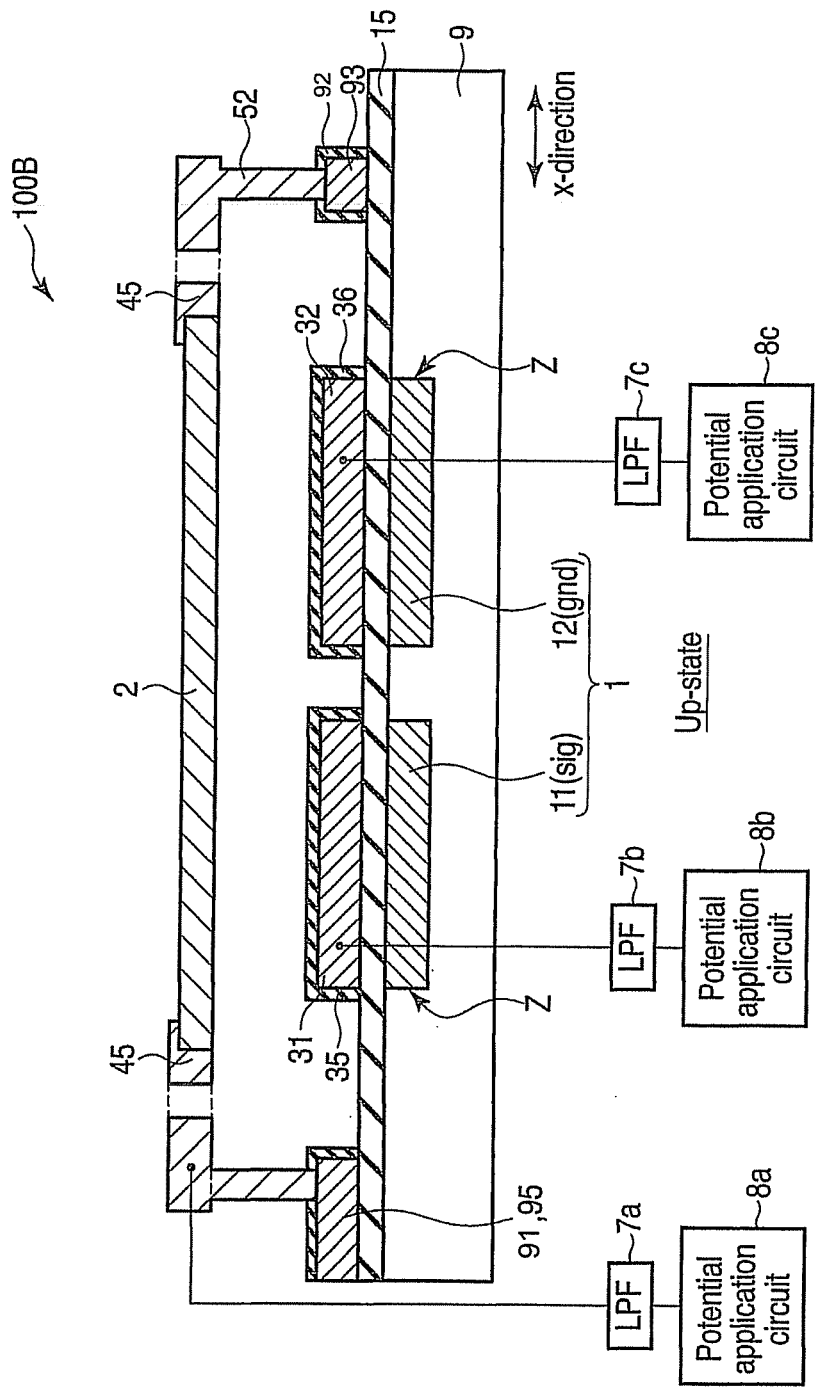
FIG. 5 is a cross-sectional view showing a structural example of the MEMS device according to the first embodiment.

A structure of a MEMS variable capacitance device 100B according to Structural Example 2 of this embodiment will now be described with reference to FIGS. 4 and 5. FIG. 4 shows a planar configuration of the MEMS variable capacitance device 100B in this structural example. FIG. 5 shows a cross-sectional configuration taken along line A-A' in FIG. 4.

A difference from the MEMS device according to Structural Example 1 will be mainly explained.

In the MEMS variable capacitance device 100B according to this structural example, a spring structure 41 using a ductile material is not connected to an upper capacitive/drive electrode 2.

As shown in FIGS. 4 and 5, the upper capacitive/drive electrode 2 using the ductile material is supported in midair by utilizing spring structures 45 using a brittle material and anchor portions 52.

The brittle material having conductivity is used for the spring structure 45. The brittle material utilized in this structural example is, e.g., W, Mo, Al—Ti, Si or poly-Si. Additionally, a material having conductivity is likewise used for the anchor portion 52. It should be noted that, as the material used for the anchor portion 52, a brittle material having conductivity like the spring structure 45 may be adopted, or a ductile material having conductivity like the upper capacitive/drive electrode 2 may be adopted.

The anchor portion 52 directly comes into contact with an interconnect 91 or 95 through an opening portion formed in an insulating film 92.

Since the spring structure 45 using the brittle material and the anchor portion 52 have conductivity, a bias potential/ground potential is applied to the upper capacitive/drive electrode 2 from the interconnect (power supply line) 91 or 95 through the spring structure 45 and the anchor portion 52 even though the spring structure using the ductile material is not provided.

In this structural example, like the structure depicted in FIG. 2C, a potential (bias potential/ground potential) is applied to the upper capacitive/drive electrode 2 and lower drive electrodes 31 and 32 via a low-pass filter 7a.

As described above, the potential is applied to the upper capacitive/drive electrode 2 via low-pass filter 7a. Therefore, low-pass filter 7a can reduce attenuation of the applied potential. Accordingly, even if the resistivity of the conductive brittle material is higher than that of the ductile material, application of the potential from the spring structure 45 using the conductive brittle material does not greatly affect an operation of the MEMS variable capacitance device 100B.

Therefore, in Structural Example 2 according to the first embodiment, the MEMS device that suppresses the deterioration of characteristics due to creep can be realized.

(A-3) Structural Example 3

Figure 6:
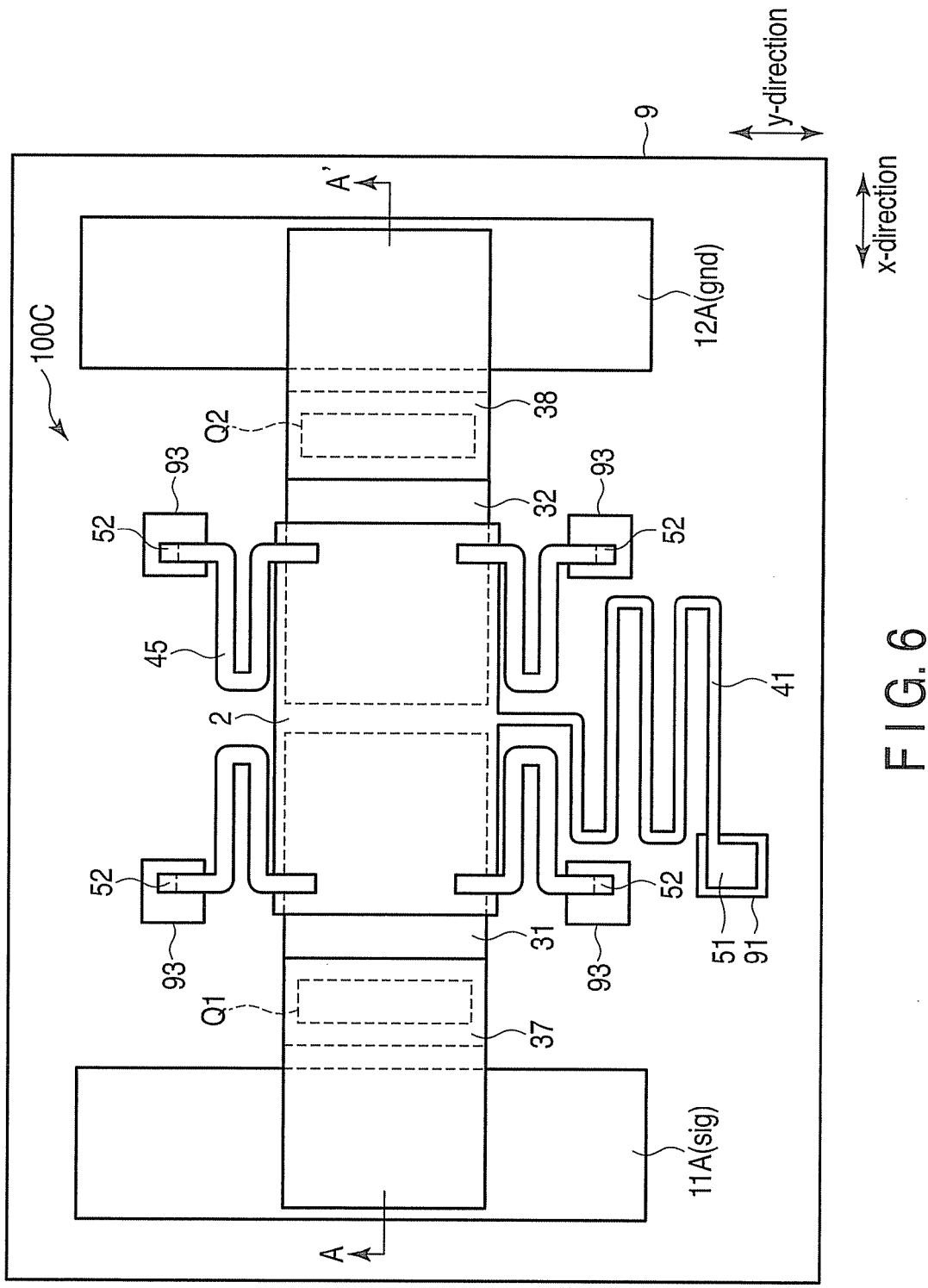
FIG. 6 is a plan view showing a structural view of the MEMS device according to the first embodiment.
Figure 7B:
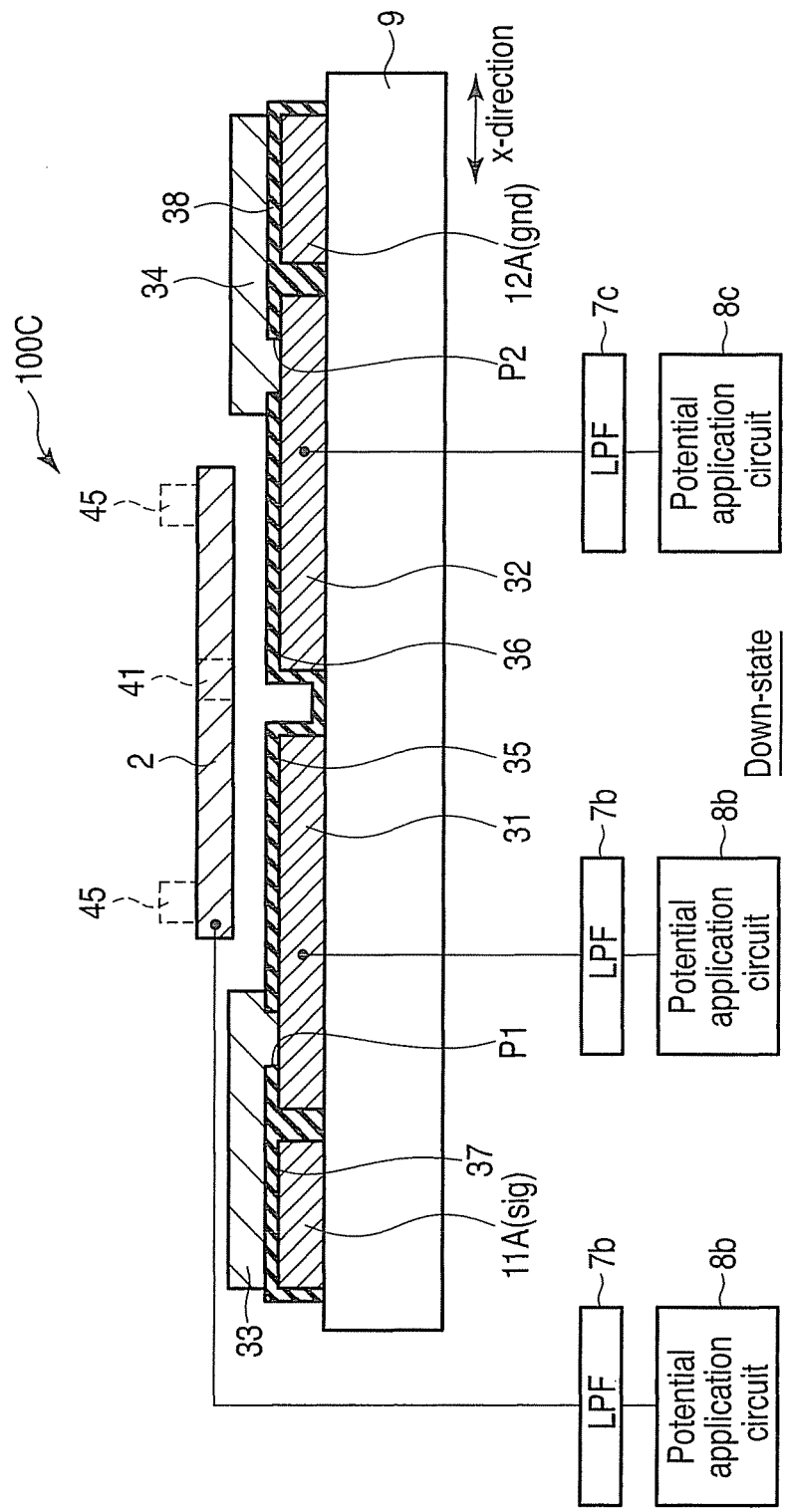
FIG. 7B is a view for explaining an operation of the MEMS device according to the first embodiment.

A configuration of a MEMS variable capacitance device 100C according to Structural Example 3 of this embodiment will now be described with reference to FIGS. 6, 7A and 7B. FIG. 6 shows a planar structure of the MEMS variable capacitance device in this structural example. FIG. 7A shows a cross-sectional structure taken along line A-A' in FIG. 6. FIG. 7B shows a state when the MEMS variable capacitance device 100C according to this structural example is driven. It should be noted that members in a front-side or perspective direction in FIGS. 7A and 7B are indicated by broken lines in the drawings.

As shown in FIGS. 6 and 7A, in the MEMS variable capacitance device 100C according to this structural example, lower drive electrodes 31 and 32 are not stacked on lower capacitive electrodes 11A and 12A.

As shown in FIGS. 6 and 7A, the lower capacitive electrodes 11A and 12A are provided on a substrate 9. In this structural example, the lower capacitive electrodes 11A and 12A are formed of a signal electrode 11A and a ground electrode 12A forming a pair. The signal electrode 11A and the ground electrode 12A extend in the y-direction. The signal electrode 11A functions as a signal line sig, and the ground electrode 12A functions as a ground line gnd. The potential on the signal electrode 11A is variable, and it fluctuates with an operation of an upper capacitive/drive electrode 2. For example, ground potential is applied to the ground electrode 12A. A potential difference (an RF voltage) between the signal electrode 11A and the ground electrode 12A becomes an output (RF power) from the MEMS variable capacitance device 100C.

The two lower drive electrodes 31 and 32 are adjacent to each other in the x-direction. The two lower drive electrodes 31 and 32 are provided on the substrate 9 between the signal electrode 11A and the ground electrode 12A. The first lower drive electrode 31 is adjacent to the signal electrode 11A in the x-direction. The second lower drive electrode 32 is adjacent to the ground electrode 12A in the x-direction.

The lower drive electrodes 31 and 32 are provided below the upper capacitive/drive electrode 2 in a direction vertical to a surface of the substrate 9, and the two lower drive electrodes 31 and 32 are partially arranged at positions where they vertically overlap the upper capacitive/drive electrode 2.

Further, the signal electrode 11A and the ground electrode 12A are arranged at positions where they do not vertically overlap the upper capacitive/drive electrode 2 in the direction vertical to the surface of the substrate 9, for example.

It should be noted that the signal/ground electrodes 11A and 12A are simultaneously formed by using, e.g., the same material as the lower drive electrodes 31 and 32. At this time, film thicknesses of the signal/ground electrodes 11A and 12A are equal to film thicknesses of the lower drive electrodes 31 and 32.

Surfaces of the lower drive electrodes 31 and 32 are covered with insulating films 35 and 36, respectively. Opening portions Q1 and Q2 are provided in the insulating films 35 and 36, respectively. The opening portions Q1 and Q2 are provided at positions where they do not vertically overlap the upper capacitive/drive electrode 2 in the direction vertical to the surface of the substrate 9. Surfaces of the signal electrode 11A and the ground electrode 12A are covered with insulating films 37 and 38, respectively. The insulating films 37 and 38 are simultaneously formed by using, e.g., the same material as the insulating films 35 and 36. In this case, film thicknesses of the insulating films 37 and 38 are equal to film thicknesses of the insulating films 35 and 36.

As described above, in the MEMS variable capacitance device 100C according to this structural example, the signal electrode 11A and the ground electrode 12A are provided on the same interconnect level as that of the lower drive electrodes 31 and 32. It should be noted that the interconnect level is a height (position) provided when the surface of the substrate 9 or a surface of a silicon substrate below the substrate 9 are determined as a reference.

First and second conductive layers 33 and 34 are provided on the insulating films 35, 36, 37 and 38.

The first conductive layer 33 is laminated on the signal electrode 11A via the insulating film 37. The first conductive layer 33 is in direct contact with the lower drive electrode 31 via the opening portion Q1.

The second conductive layer 34 is laminated on the ground electrode 12A through the insulating film 38. The second conductive layer 34 is in direct contact with the lower drive electrode 32 via the opening portion Q2. It should be noted that the conductive layers 33 and 34 are arranged at positions where they do not vertically overlap the upper capacitive/drive electrode 2 in the direction vertical to the substrate surface, for example.

In the MEMS variable capacitance device 100C according to Structural Example 3, an MIM capacitive element is formed by using the signal electrode 11A, the first conductive layer 33, and the insulating film 37 sandwiched between the signal electrode 11A and the conductive layer 33. The MIM capacitive element has a fixed capacitance $C_1$ in accordance with an opposed area of the electrode 11A and the conductive layer 33, a film thickness of the insulating film 37 and a dielectric constant of the insulating film 37. Likewise, the ground electrode 12A, the first conductive layer 34 and the insulating film 38 constitute an MIM capacitive element, and this element has a fixed capacitance $C_2$. In this manner, each of the conductive layers 33 and 34 functions as an electrode of the MIM capacitive element.

The MEMS variable capacitance device 100C has capacitive coupling between the upper capacitive/drive electrode 2 and the lower drive electrode 31. Furthermore, the MEMS variable capacitance device 100C has capacitive coupling between the upper capacitive/drive electrode 2 and the lower drive electrode 32. Intensities of the capacitive couplings are capacitances $C_3$ and $C_4$. Intensities of the capacitances $C_3$ and $C_4$ vary with vertical movement of the upper capacitive/drive electrode 2.

As described above, the lower drive electrodes 31 and 32 are electrically connected to the conductive layers 33 and 34 via the opening portions Q1 and Q2, respectively. Therefore, the MEMS variable capacitance device 100C according to this structural example has a configuration that the capacitances (capacitive couplings) $C_3$ and $C_4$ are connected to the capacitances $C_1$ and $C_2$ in series by the opening portions Q1 and Q2 and the conductive layers 33 and 34.

The upper capacitive/drive electrode 2 is connected to anchor portions 51 and 52 through spring structures 41 and 45. The upper capacitive/drive electrode 2 is supported in midair above the lower drive electrodes 31 and 32 by the anchor portions 51 and 52.

A potential is applied to the upper capacitive/drive electrode 2 through the spring structure 41 using a ductile material and the anchor portion 51. In this structural example, the spring structure 41 using the ductile material and the spring structure 45 using a brittle material are provided at an end portion of the upper capacitive/drive electrode 2 in the y-direction, respectively. It should be noted that, like Structural Example 2, when the spring structure 45 is formed of a conductive brittle material, the spring structure 41 using the ductile material does not have to be provided.

As shown in FIG. 7B, in the MEMS variable capacitance device 100C according to this structural example, when a potential difference equal to or above a pull-in voltage is provided between the upper capacitive/drive electrode 2 and the lower drive electrodes 31 and 32, the upper capacitive/drive electrode 2 moves down toward the lower drive electrodes 31 and 32. That is, the MEMS variable capacitance device 100C change to a down-state from an up-state.

In the MEMS variable capacitance device 100C according to this structural example, not only the potential on the lower capacitive electrode (signal electrode) 11A is fluctuated by simply changing an inter-electrode distance between the movable upper capacitive electrode 2 and the lower capacitive electrode 11A but also a configuration that the single MIM capacitive element (capacitance $C_1$ or $C_2$) is connected to the single capacitive coupling (capacitance $C_3$ or $C_4$) between the upper capacitive electrode 2 and the lower capacitive electrode 11A is utilized.

When the movable upper electrode 2 has entered the down-state from the up-state, intensities of the capacitances $C_3$ and $C_4$ of the capacitive couplings change. With the change in the capacitances $C_3$ and $C_4$, the potential on the MIM capacitive element having a fixed capacitance $C_1$ or $C_2$ fluctuates. As a result, the potential on the signal electrode 11A as one electrode of the MIM capacitive element fluctuates. Incidentally, since the potential on the ground electrode 11B is fixed to ground potential, it is not displaced even if the upper capacitive/drive electrode 2 vertically moves.

As a result, a potential difference between the signal electrode 11A and the ground electrode 12A is output as an RF voltage $V_{RF}$.

Even if the lower capacitive electrode 11A is arranged at a position where it does not vertically overlap the upper capacitive electrode 2 in this manner, the potential on the lower capacitive electrode 11A fluctuates.

In the manufacturing method of the MEMS variable capacitance device according to this structural example, the signal electrode 11A and the ground electrode 12A are simultaneously formed at the same step as that of the lower drive electrodes 31 and 32. That is, the MEMS variable capacitance device 100C according to this structural example can be formed at a simple step without using the damascene process.

Further, in this structural example, since the signal/ground electrodes 11A and 12A are formed on the same interconnect level (an interconnect layer) as the lower drive electrodes 31 and 32, even if the conductive layers 37 and 38 are newly provided, the number of substantial interconnect levels required for formation of the MEMS variable capacitance device 100C is two.

Therefore, in the MEMS variable capacitance device 100C according to Structural Example 3 of this embodiment, the number of interconnect levels can be reduced as compared with a MEMS variable capacitance device having a stacked electrode structure. Thus, according to the MEMS variable capacitance device 100C of this structural example, a manufacturing cost can be reduced.

In this structural example, like Structural Example 1, the MEMS variable capacitance device 100C has a configuration that the spring structure 41 having the ductile material and spring structure 45 using the brittle material are connected to the movable upper electrode (upper capacitive/drive electrode) 2. Therefore, a distance between the movable upper electrode 2 and the lower electrodes (lower drive electrodes in this example) 31 and 32 in the up-state of the MEMS variable capacitance device 100C is dependent on the spring constant of the spring structure 45 using the brittle material.

Accordingly, even if an operation of the MEMS variable capacitance device is repeated more than once, the influence of creep on the upper electrode 2 becomes small.

Therefore, according to Structural Example 3 of the first embodiment, the MEMS device that suppresses the deterioration of characteristics due to creep can be realized.

(A-4) Structural Example 4

Figure 8:
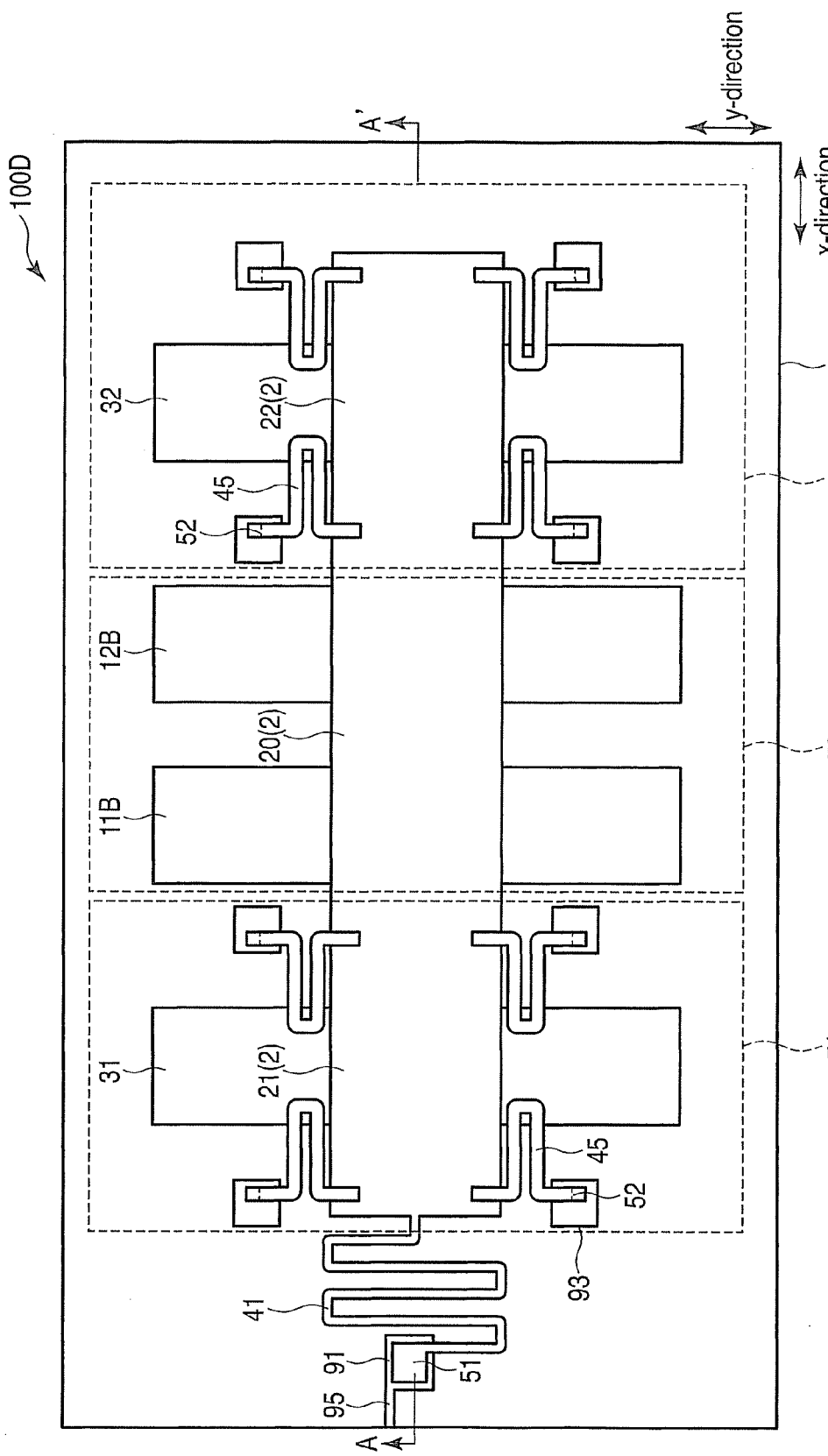
FIG. 8 is a plan view showing a structural example of the MEMS device according to the first embodiment.
Figure 9A:
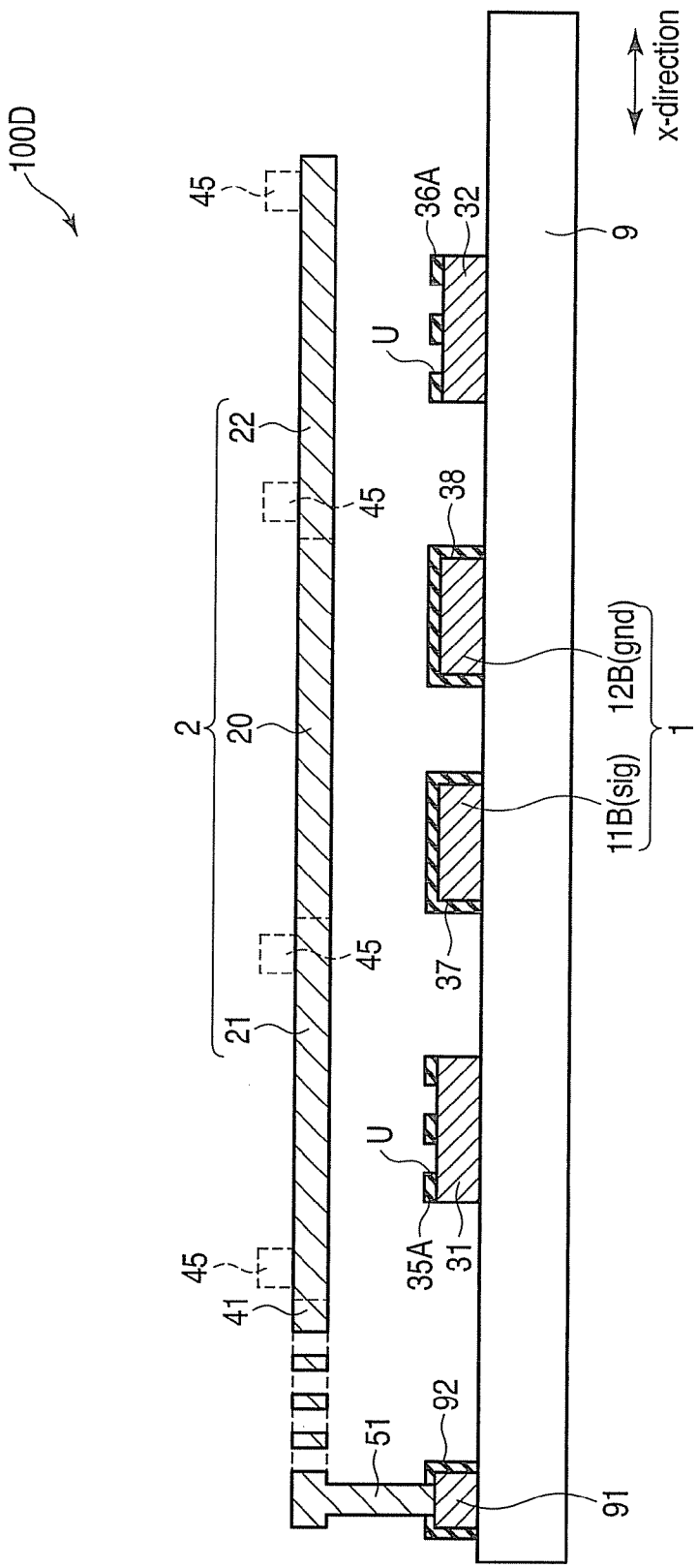
FIGS. 9A, 9B and 10 are cross-sectional views each showing a structural example of the MEMS device according to the first embodiment.
Figure 9B:
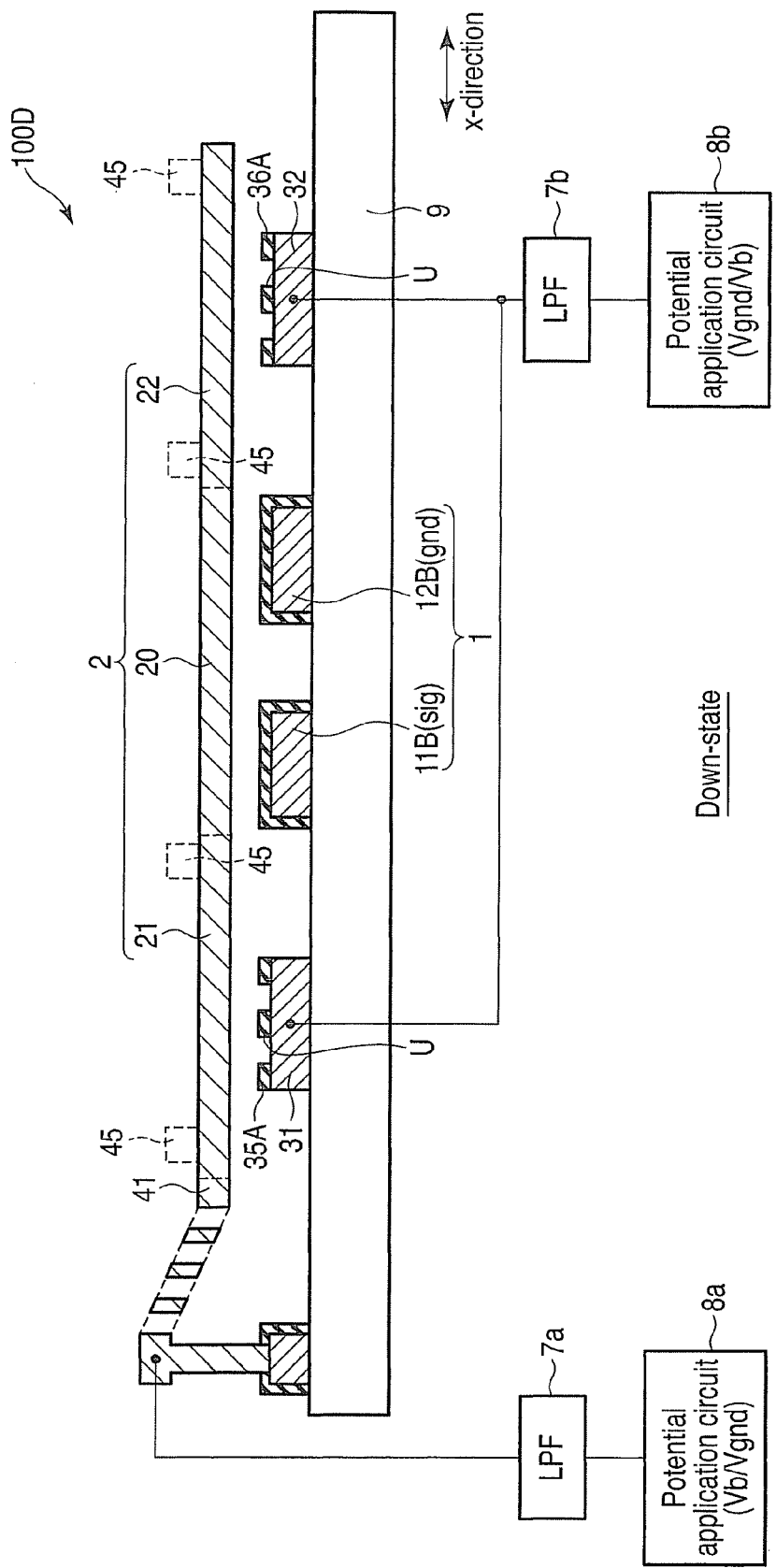

A MEMS variable capacitance device according to Structural Example 4 of this embodiment will now be described with reference to FIGS. 8 to 10. FIG. 8 shows a planar structure of a MEMS variable capacitance element 100D according to this structural example. FIG. 9A shows a cross-sectional structure taken along line A-A' in FIG. 8. FIG. 9B shows a state at the time of drive of the MEMS variable capacitance device according to this structural example.

A differences between the MEMS variable capacitance device 100D according to this structural example and the MEMS variable capacitance devices according to Structural Examples 1 to 3 will be mainly explained.

The MEMS variable capacitance device 100D according to this embodiment is different from the other structural examples in that lower capacitive electrodes and lower drive electrodes are electrically separated from each other.

As shown in FIGS. 8 and 9A, two lower drive electrodes 31 and 32 are provided on a substrate 9. The two lower drive electrodes 31 and 32 extend in the y-direction. Insulating films 35A and 36A are provided on upper surfaces of the two lower drive electrodes 31 and 32, respectively. Each of the insulating films 35A and 36A has slits U. The insulating films 35A and 36A are not provided on, e.g., side surfaces of the lower drive electrodes 31 and 32.

A signal electrode 11B and a ground electrode 12B are provided on the substrate 9 between the two lower drive electrodes 31 and 32. The signal electrode 11B and the ground electrode 12B extend in the y-direction. Surfaces of the signal/ground electrodes 11B and 12B are covered with insulating films 37 and 38. The same material as, e.g., the lower drive electrodes 31 and 32 is used for the signal/ground electrodes 11B and 12B, and film thicknesses of the signal/ground electrodes 11B and 12B are equal to film thicknesses of the lower drive electrodes 31 and 32.

The signal electrode 11B and the ground electrode 12B function as lower capacitive electrodes of the MEMS variable capacitance device 100D. The potential on the signal electrode 11B is variable, and the potential on the ground electrode 12B is set to a fixed potential (e.g., ground potential).

An upper capacitive/drive electrode 2 is one conductive layer and extends in, e.g., the x-direction. Furthermore, like the other structural examples, the upper capacitive/drive electrode 2 functions as a capacitive electrode and also functions as a drive electrode.

In this structural example, the lower drive electrodes 31 and 32 are adjacent to one end and the other end of the two neighboring lower capacitive electrodes 11A and 12 in the x-direction. Therefore, in the MEMS variable capacitance element 100D according to this structural example, although the upper electrode 2 is not electrically separated from the capacitive electrodes and the drive electrodes, its configuration is substantially the same as a configuration that movable upper drive electrodes of an actuator are connected with one end and the other end of a movable upper capacitive electrode of a variable capacitance element.

That is, a portion 20 of the upper electrode 2 placed above the signal/ground electrodes 11A and 12A functions as a substantial upper capacitive electrode. This portion 20 will be referred to as an upper capacitive electrode portion 20 hereinafter. The upper capacitive electrode portion 20 and the lower capacitive electrodes 11A and 12 constitute a variable capacitance element 70. A cavity is provided between the upper capacitive electrode portion 20 and the lower capacitive electrodes 11A and 12.

Moreover, portions 21 and 22 of the upper electrode 2 placed above the lower drive electrodes 31 and 32 function as substantial drive electrodes. The portions 21 and 22 will be referred to as upper drive electrode portions 21 and 22 hereinafter. The upper drive electrode portion 21 and the lower drive electrode portion 31 constitute one electrostatic drive type actuator 71. The upper drive electrode 22 and the lower drive electrode 32 constitute one electrostatic drive type actuator 72. A cavity is provided between the upper drive electrodes 21 and 22 and the lower drive electrodes 31 and 32.

A spring structure 41 using a ductile material is connected to the upper capacitive/drive electrode 2. In this structural example, the spring structure 41 is connected to one end in the x-direction of the upper drive electrode portion 21 in the upper capacitive/drive electrode 2. Additionally, spring structures 45 using a brittle material are connected to both ends in the y-direction of each of the upper drive electrode portions 21 and 22 in the upper capacitive/drive electrode 2. It should be noted that the spring structure using the ductile material or the spring structure using the brittle material may be connected to the upper capacitive electrode portion 20.

In this manner, the MEMS variable capacitance device 100D according to this structural example has a structure equivalent to a center impeller structure (bridge structure) that upper drive electrodes of an actuator are connected to one end and the other end of the upper capacitive electrode portion 20. Further, in the MEMS variable capacitance device 100D according to this structural example, the upper capacitive/drive electrode 2 formed of one conductive layer is supported in midair to cut across the upper sides of the lower capacitive electrodes 11B and 12B and upper sides of the lower drive electrodes 31 and 32.

FIG. 9B shows a down-state of the MEMS variable capacitance device 100D according to this structural example. Furthermore, FIG. 9B also shows a connecting relationship between the MEMS variable capacitance device 100D and potential application circuits 8A and 8B.

In this structural example, the two lower drive electrodes 31 and 32 are connected to one potential application circuit 8b in common through one low-pass filter 7b, for example. However, the two lower drive electrodes 31 and 32 may be connected to different low-pass filters or may be connected to different potential application circuits. The upper capacitive/drive electrode 2 and the spring structure 41 are connected to potential application circuit 8a through low-pass filter 7a. Therefore, the upper capacitive electrode portion 20 and the upper drive electrode portions 21 and 22 are set to the same potential. It should be noted that, like Structural Example 2, a conductive brittle material (e.g., W) may be used to apply the potential to the upper capacitive/drive electrode 2 through the spring structure 45 adopting the brittle material.

When a potential difference (pull-in voltage) is provided between the upper drive electrode portions 21 and 22 and the lower drive electrodes 31 and 32, the upper drive electrode portions 21 and 22 move down toward the lower drive electrodes 31 and 32. Since the upper capacitive electrode portion 20 is a conductive layer that is continuous with the upper drive electrode portions 21 and 22, the upper capacitive electrode portion 20 moves down toward the signal/ground electrodes 11A and 12A with operations of the upper drive electrodes 21 and 22. As a result, an inter-electrode distance between the upper capacitive electrode portion 20 and the signal electrode 11B changes, and the potential in the signal electrode 11B fluctuates. A potential difference between the signal electrode 11B and the ground electrode 11B is output as an RF voltage.

When a pull-out voltage is applied between the upper drive electrode portions 21 and 22 and the lower drive electrodes 31 and 32, the upper capacitive/drive electrode 2 returns to the up-state from the down-state as depicted in FIG. 9A.

In the MEMS variable capacitance element 100D according to this structural example, the insulating films 35A and 36A covering the lower drive electrodes 31 and 32 have the slits U. As a result, in the down-state of the MEMS variable capacitance element 100D, load capacities produced between the upper drive electrode portions 21 and 22 and the lower drive electrodes 31 and 32 are reduced. Further, in the MEMS variable capacitance element 100D according to this Structural Example 4, since the signal/ground electrodes 11A and 12 are electrically separated from the lower drive electrodes 31 and 32, capacitances (capacitive couplings) between the signal/ground electrodes 11A and 12 and the lower drive electrodes 31 and 32 are small. As a result, the load capacities applied to the lower drive electrodes 31 and 32 are further decreased.

Therefore, the MEMS variable capacitance element 100D according to this Structural Example 4 can be driven at a high speed.

Figure 10:
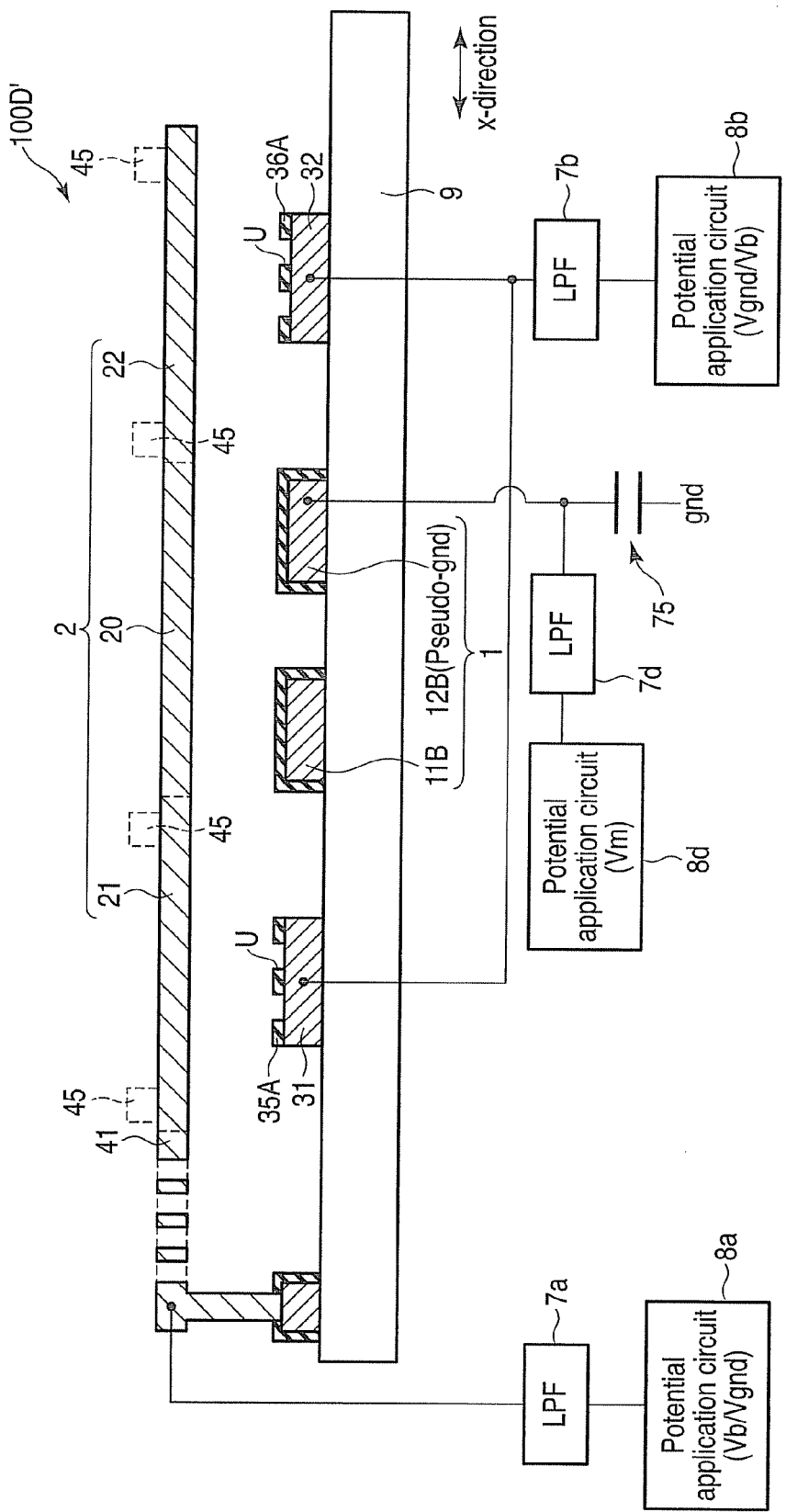

It should be noted that, like a MEMS variable capacitance device 100D' depicted in FIG. 10, a DC cut capacitive element (blocking capacitor) 75 may be connected to the ground electrode 11B in the two lower capacitive electrodes. The DC cut capacitive element 75 is an MIM capacitive element that has a fixed capacitance and is formed on, e.g., the substrate 9. The DC cut capacitive element 75 prevents a direct-current component included in a potential of a ground line (ground electrode 12B) from being output to the outside.

As shown in FIG. 10, a potential application circuit 8d is connected to a portion between the DC cut capacitive element 75 and the ground electrode 11B through a low-pass filter 7d. Potential application circuit 8d applies a fixed potential Vm to the ground electrode 11B. The potential Vm is, e.g., approximately 5 V. In the MEMS variable capacitance device depicted in FIG. 10, the ground electrode 12B is a pseudo-ground line (Pseudo-gnd) to which the potential Vm (>0) is applied.

Like the configuration depicted in FIG. 10, when the potential Vm is applied to the ground electrode 12B to use the ground electrode 12B as the pseudo-ground line, adhesion between the upper capacitive electrode portion 20 and the lower capacitive electrode 1 (signal/ground electrode 11B) increases due to electrostatic attractive force generated by the potential Vm. Therefore, the MEMS variable capacitance element 100D' depicted in FIG. 10 can obtain a larger capacitance value and a larger output.

In the MEMS variable capacitance devices 100D and 100D' according to Structural Example 4 of this embodiment, the spring structure 41 using the ductile material and the spring structure 51 using the brittle material are connected to the movable upper electrode (upper capacitive/drive electrode) 2. Therefore, a distance between the movable upper electrode 2 and the lower electrodes 11B and 12B in the up-state of each of the MEMS variable capacitance device 100D and 100D' is determined based on the spring constant of the spring structure 45 using the brittle material. Therefore, even if an operation of the MEMS variable capacitance device is repeated more than once, the influence of creep on the upper electrode 2 is reduced.

Therefore, according to Structural Example 4 of the first embodiment, the MEMS device that suppresses the deterioration of characteristics due to creep can be realized.

(A-5) Application Example

Figure 11:
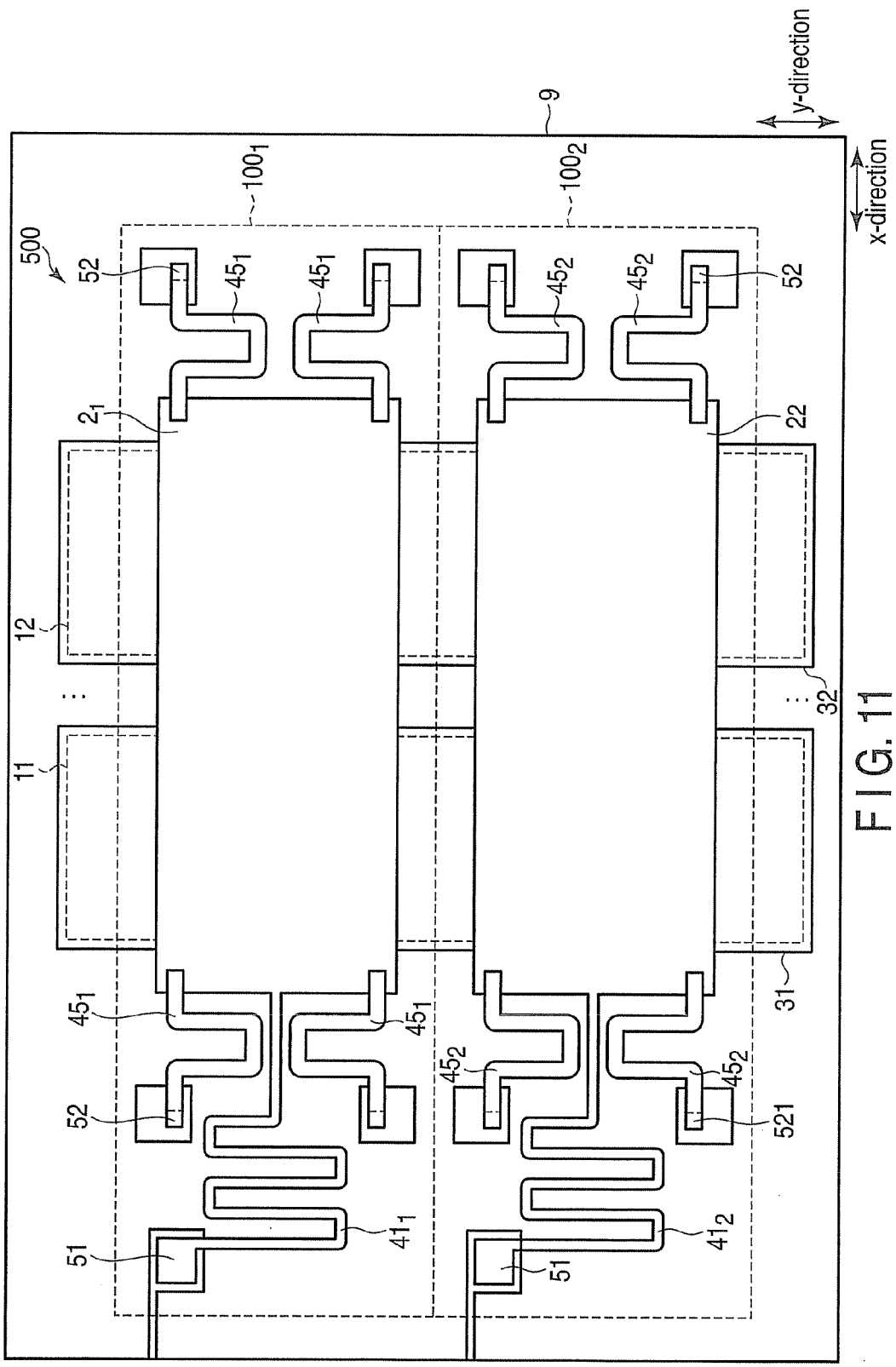
FIG. 11 is a view showing an application example of the MEMS device according to the first embodiment.

An application example of the MEMS device according to the first embodiment will now be described with reference to FIG. 11. FIG. 11 shows a planar structure of a MEMS device (capacitive bank) in this application example. As shown in FIG. 11, a plurality of MEMS variable capacitance devices $100_1$ and $100_2$ may be adopted to constitute a capacitive bank.

As shown in FIG. 11, a capacitive bank 500 is formed of the plurality of MEMS variable capacitance devices $100_1$ and $100_2$. The capacitive bank 500 shown in FIG. 11 uses the plurality of MEMS variable capacitance devices explained in Structural Example 1 (FIG. 1). However, the capacitive bank 500 may be constituted of the MEMS variable capacitance devices described in Structural Examples 2 to 4. Here, although the two MEMS variable capacitance devices $100_1$ and $100_2$ are shown for simplification of the drawing, three or more MEMS variable capacitance devices may be of course utilized to constitute the capacitive bank 500.

The plurality of MEMS variable capacitance devices $100_1$ and $100_2$ are provided on one substrate 9. The plurality of MEMS variable capacitance devices $100_1$ and $100_2$ are aligned along the y-direction.

Signal/ground electrodes 11 and 12 and lower drive electrodes 31 and 32 extend in the y-direction, and these electrodes 11, 12, 31 and 32 are shared by the plurality of MEMS variable capacitance devices $100_1$ and $100_2$ aligned in the y-direction. As described with reference to FIG. 2A in Structural Example 1 of the first embodiment, lower drive electrodes 31 and 32 are stacked on signal/ground electrodes 11 and 12 through insulating films.

Upper capacitive/drive electrodes $2_1$ and $2_2$ are provided in accordance with the MEMS variable capacitance devices $100_1$ and $100_2$. Furthermore, spring structures $41_1$ and $41_2$ using a ductile material and spring structures $45_1$ and $45_2$ using a brittle material are connected to the respective upper capacitive/drive electrodes $2_1$ and $2_2$. The upper capacitive/drive electrodes $2_1$ and $2_2$ are connected to anchor portions 51 and 52 through the spring structures $41_1$, $41_2$, $45_1$ and $45_2$. As a result, the respective upper capacitive/drive electrodes $2_1$ and $2_2$ are supported in midair above the drive electrodes 31 and 32.

In FIG. 11, although not shown, like the structure depicted in FIG. 2C, low-pass filters are connected to the two lower drive electrodes 31 and 32, respectively. Moreover, a potential is applied to each of the lower drive electrodes 31 and 32 from a potential application circuit through each low-pass filter.

Additionally, a low-pass filter is connected to each of the upper capacitive/drive electrodes $2_1$ and $2_2$. Likewise, a potential application circuit is connected to each of the upper capacitive/drive electrodes $2_1$ and $2_2$ through the low-pass filters. In this manner, a potential is individually applied to the respective upper capacitive/drive electrodes $2_1$ and $2_2$ of the MEMS variable capacitance devices $100_1$ and $100_2$.

As a result, the respective MEMS variable capacitance devices $100_1$ and $100_2$ are controlled to individually enter two states, i.e., an up-state and a down-state.

As described above, the single MEMS variable capacitance device $100_1$ outputs an RF voltage (RF power) in the range of the two states, i.e., the up-state and the down-state. Therefore, the frequency and magnitude of the RF voltage output from the single MEMS variable capacitance device $100_1$ are restricted to values obtained from the movable range of the up-state/down-state and an operation cycle.

Like this application example, when the plurality of MEMS variable capacitance devices $100_1$ and $100_2$ are utilized to constitute the capacitive bank 500, the capacitive bank 500 can output an RF voltage having a frequency higher than that of the RF voltage output from the single MEMS variable capacitance device by controlling the up-state/down-state of each MEMS variable capacitance device $100_1$ or $100_2$. That is, the capacitive bank 500 can obtain an RF voltage having a higher frequency by adjusting a timing at which each MEMS variable capacitance device $100_1$ or $100_2$ enters the up-state or the down-state. Further, an RF voltage having a higher value can be obtained by using the capacitive bank 500 to simultaneously drive the plurality of MEMS variable capacitance devices $100_1$ and $100_2$.

Therefore, when the plurality of MEMS variable capacitance devices $100_1$ and $100_2$ are utilized to configure the capacitive bank 500, an output in a wider frequency domain (an RF voltage/RF power) can be obtained.

In the capacitive bank 500, a spring structure 41 using a ductile material and spring structures 45 using a brittle material are connected to the movable upper electrode 2 in each MEMS variable capacitance device $100_1$ or $100_2$. Therefore, in the up-state of each MEMS variable capacitance device $100_1$ or $100_2$, a distance between the movable upper electrode 2 and the lower electrode is dependent on a spring constant of the spring structure 45 using the brittle material. Therefore, even if an operation of each MEMS variable capacitance device is repeated more than once, the influence of creep on the upper electrode 2 is reduced.

Accordingly, even in the capacitive bank 500 using the plurality of MEMS variable capacitance devices $100_1$ and $100_2$, the MEMS devices that suppress the deterioration of characteristics due to creep can be realized.

(B) Switch

The MEMS device according to the embodiment is not restricted to the MEMS variable capacitance element, and it may be any other device to which the MEMS is applied.

A switch to which the MEMS is applied (which will be referred to as a MEMS switch hereinafter) will be taken as an example, and a MEMS device according to a second embodiment will now be described with reference to FIGS. 12 to 16.

(B-1) Structural Example 1

Figure 12:
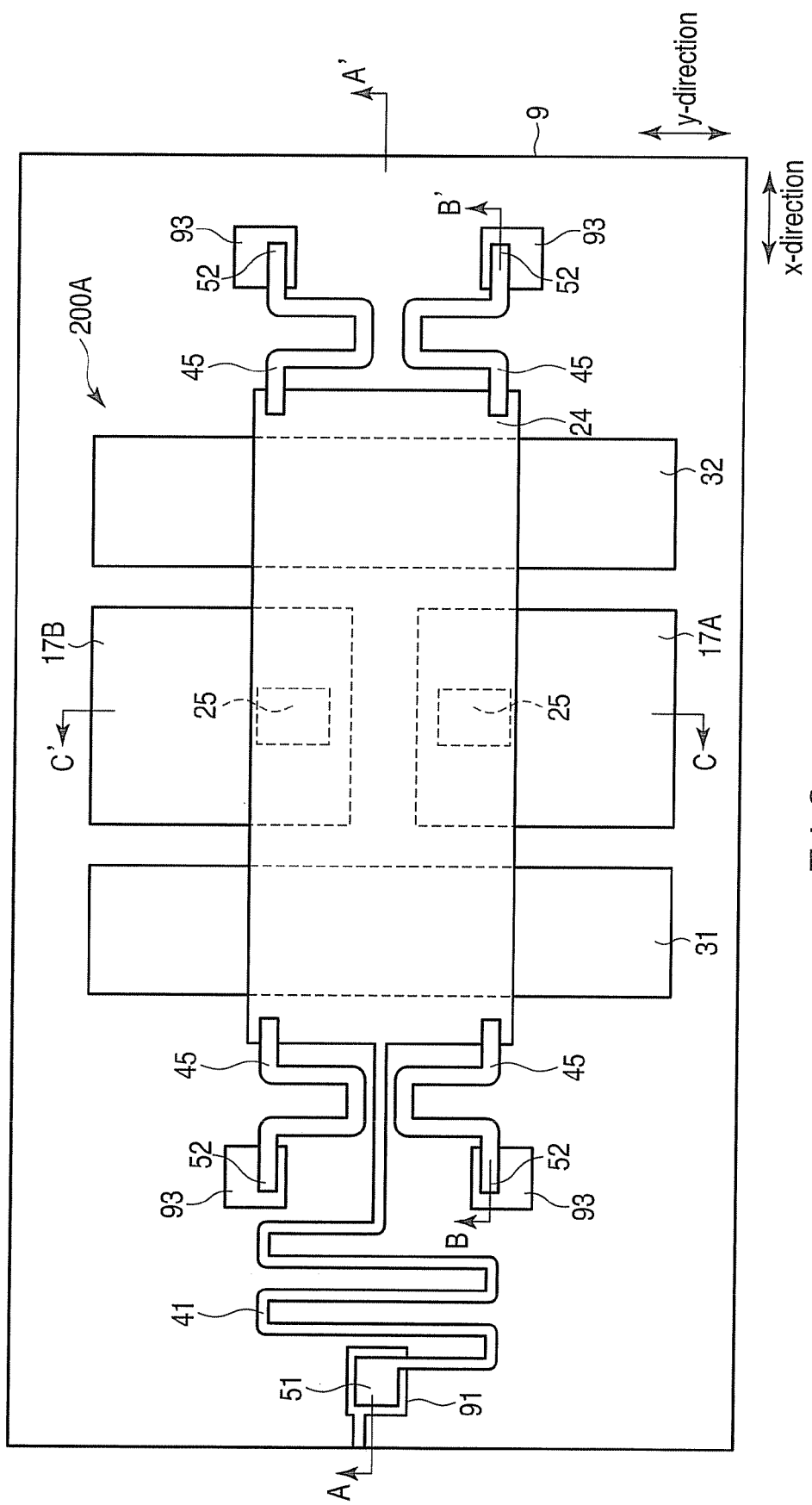
FIG. 12 is a plan view showing a structural example of a MEMS device according to a second embodiment.
Figure 13A:
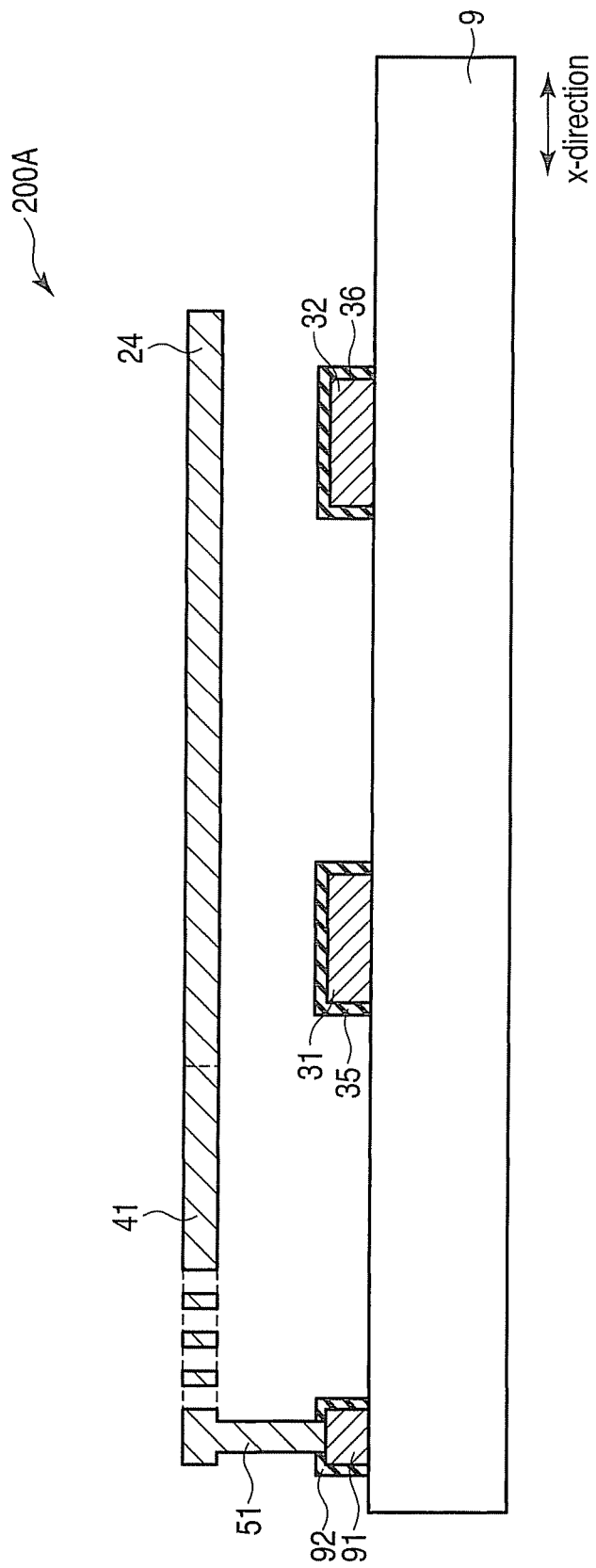
FIGS. 13A and 13B are cross-sectional views each showing a structural example of the MEMS device according to the second embodiment.
Figure 13B:
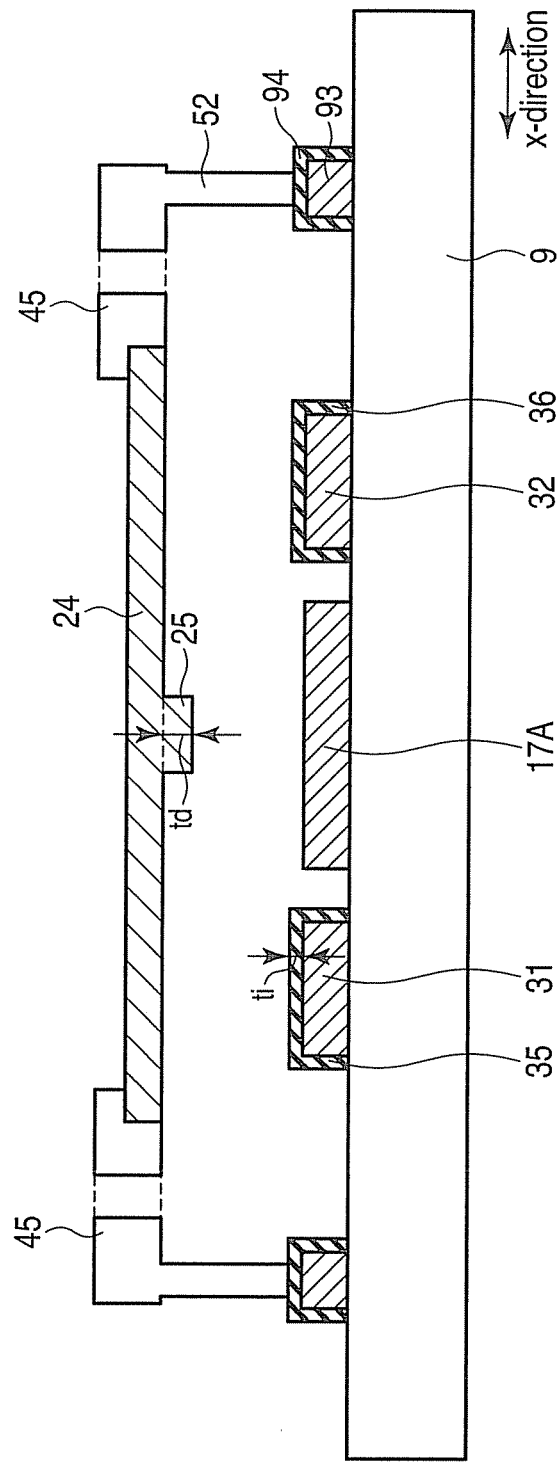

A configuration of a MEMS switch 200A according to Structural Example 1 according to this embodiment will now be described with reference to FIGS. 12 to 14. FIG. 12 is a plan view showing a planar structure of the MEMS switch 200A according to this structural example. FIG. 13A is a cross-sectional view showing a cross-sectional structure taken along line A-A' in FIG. 12. FIG. 13B is a cross-sectional view showing a cross-sectional structure taken along line B-B' in FIG. 12. FIG. 14 shows a cross-sectional structure taken along line C-C' in FIG. 12. Furthermore, FIG. 14 shows a state at the time of drive of the MEMS switch 200A.

As depicted in FIGS. 12 to 14, two lower drive electrodes 31 and 32 are provided on a substrate 9. The lower drive electrodes 31 and 32 are arranged parallel to the x-direction. Surfaces of the lower drive electrodes 31 and 32 are covered with insulating films 35 and 36. A potential is applied to the lower drive electrode 31 via an interconnect (not shown).

Two signal electrodes (ports) 17A and 17B are provided on a substrate 9 between the two lower drive electrodes 31 and 32. The two signal electrodes 17A and 17B are arranged parallel to the y-direction.

A movable structure 24 is connected with anchor portions 51 and 52 through spring structures 41 and 45. As a result, the movable structure 24 is supported in midair above the signal electrodes 17A and 17B and above the lower drive electrodes 31 and 32. An air gap is provided between the movable structure 24 and the electrodes 17A, 17B, 31 and 32.

Protruding portions (which will be referred to as dimples hereinafter) 25 protruding toward the substrate 9 side are provided on a bottom surface of the movable structure 24. The dimples 25 are placed above the signal electrodes 17A and 17B. When the MEMS switch 200A is ON, the dimples 25 come into contact with the signal electrodes 17A and 17B. Each dimple 25 functions as a contact portion of the switch 200A. The movable structure 24 is formed of, e.g., a ductile material, and Al, an Al alloy, Au or Pt is used, for example.

The first spring structure 41 connects the first anchor portion 51 to the movable structure 24.

A ductile material is used for the first spring structure 41. For example, the same material as that of the movable structure 24 is used for the first spring structure 41 to be integrated with the movable structure 24. For example, the anchor portion 51 is formed of a conductor, and the same material (ductile material) as that of the first spring structure 41 is used.

As the ductile material used for the first spring structure 41, any one selected from Al, an alloy containing Al as a main component, Au and Pt is used like the spring structure formed of the ductile material in the MEMS variable capacitance element. It should be noted that any ductile material other than these materials may be used for the spring structure 41 adopting the ductile material.

Each second spring structure 45 connects the second anchor portion 52 to the movable structure 24.

For example, a brittle material is used for the second spring structure 45. As described above, in the MEMS switch 200A, a material different from that of the movable structure 24 is used for the second spring structure 45 like the MEMS variable capacitance element. As the brittle material used for the second spring structure 45, any one selected from Si, poly-Si, an Al—Ti alloy, SiGe, W and Mo is utilized like the spring structure using the brittle material in the MEMS variable capacitance element. It should be noted that the Al—Ti alloy may contain any element other than Al and Ti. Moreover, any brittle material other than these materials may be used for the spring structure 45 formed of the brittle material.

In a joint portion of the spring structure 45 using the brittle material and the movable structure 24, the spring structure 45 is laminated on the movable structure 24.

It is preferable for a spring constant k2 of the spring structure 45 using the brittle material to be larger than a spring constant k1 of the spring structure 41 using the ductile material. More specifically, it is preferable for the spring constant k2 to be threefold or more of the spring constant k1. To increase the spring constant of the spring structure 45 using the brittle material, a film thickness, a line width, and a shape of a bending portion of the spring structure 45 using the brittle material are appropriately set.

For example, the same material as that of the second spring structure 45 may be used for the anchor portion 52, or the same material as that of the first spring structure 41 may be used for the anchor portion 52.

For example, a potential is applied to the movable structure 24 through the spring structure 41 using the ductile material, the anchor portion 51 and an interconnect 91. It should be noted that, when a conductive brittle material is used for the spring structure 45, a potential may be applied to the movable structure 24 from the spring structure 45 using a conductive brittle material.

The MEMS switch 200A in this structural example is of an electrostatic drive type. Electrostatic attractive force is generated between the movable structure 24 and the drive electrodes 31 and 32 based on a potential difference provided between the movable structure 24 and the drive electrodes 31 and 32. The movable structure 24 is drawn toward the drive electrodes 31 and 32 by this electrostatic attractive force, and the movable structure 24 moves down toward the substrate side.

An operation of the MEMS switch 200A will now be described with reference to FIGS. 14A and 14B.

Figure 14A:
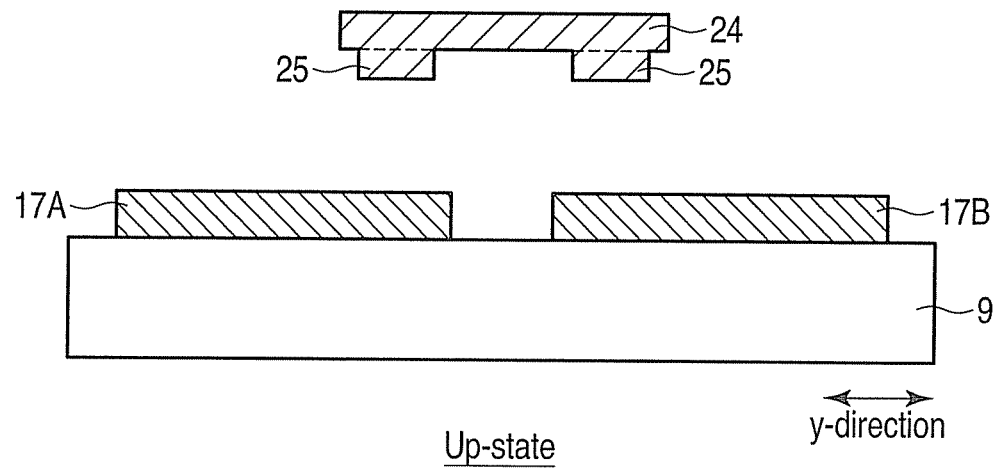
FIGS. 14A and 14B are views for explaining an operation of the MEMS device according to the second embodiment.

As shown in FIG. 14A, in a state that the movable structure 24 is supported in midair (an up-state), the contact portions (dimples 25) provided to the movable structure 24 are not in contact with the signal electrodes 17A and 17B. In this case, the MEMS switch 200A is in an OFF state.

Figure 14B:
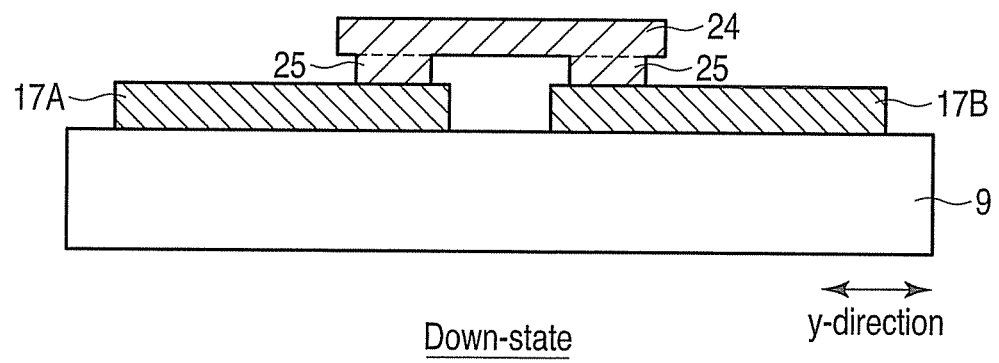

On the other hand, as shown in FIG. 14B, when a potential difference set between the movable structure 24 and the lower drive electrodes 31 and 32 becomes equal to or above a potential difference (pull-in voltage) with which the movable structure 24 starts moving, the movable structure 24 moves toward the drive electrodes 31 and 32 by electrostatic attractive force produced due to this potential difference. That is, the movable structure 24 moves toward the lower side (substrate side).

As a result, the dimples 25 of the movable structures 24 come into contact with the signal electrodes 17A and 17B, thereby achieving electrical conduction between the movable structure 24 (interconnect) 91 and the signal electrodes 17A and 17B. In this case, the MEMS switch 200A is in an ON state.

As shown in FIG. 14B, when the MEMS switch is in the ON state, the dimples 25 come into contact with the signal electrodes 17A and 17B. When the dimples (contact portions) 25 are provided on the bottom surface of the movable structure 24, force per unit area when the movable structure 24 moves toward the lower side, i.e., force when the dimples 25 come into contact with the signal electrodes 17A and 17B (contact force) increases. Therefore, contact resistances between the dimples 25 and the signal electrodes 17A and 17B can be reduced without increasing a drive voltage.

Incidentally, to achieve sufficient contact of the dimples 25 with respect to the signal electrodes 17A and 17B, it is preferable for a film thickness td of each dimple 25 to be larger than a film thickness ti of each of the insulating films 35 and 36.

As described above, the spring structure 41 using a ductile material and spring structures 45 using a brittle material are connected to the movable structure 24 that is supported in midair and moves in the vertical direction. An interval between the contact portions 25 and the signal electrodes 17A and 17B in the up-state (OFF state) of the MEMS switch is mainly determined based on the spring constant of the spring structure 45 using the brittle material. Therefore, spring structure 45 using the brittle material that hardly causes creep maintains the interval between each contact portion and each signal electrode in the up-state.

As a result, even if the MEMS switch includes the movable structure having a single-layer configuration adopting the ductile material and the spring structure using the ductile material, the influence of creep on the movable structure 24 can be suppressed, thereby realizing low losses and high isolation.

Therefore, like the MEMS variable capacitance element described in the first embodiment, the deterioration of characteristics of the element due to creep can be suppressed in the MEMS switch according to the second embodiment.

It should be noted that a manufacturing method of the MEMS switch according to this embodiment is substantially equal to the manufacturing method of the MEMS variable capacitance device explained in the first embodiment, thus omitting a description on the manufacturing method of the MEMS switch element.

(B-2) Structural Example 2

Figure 15:
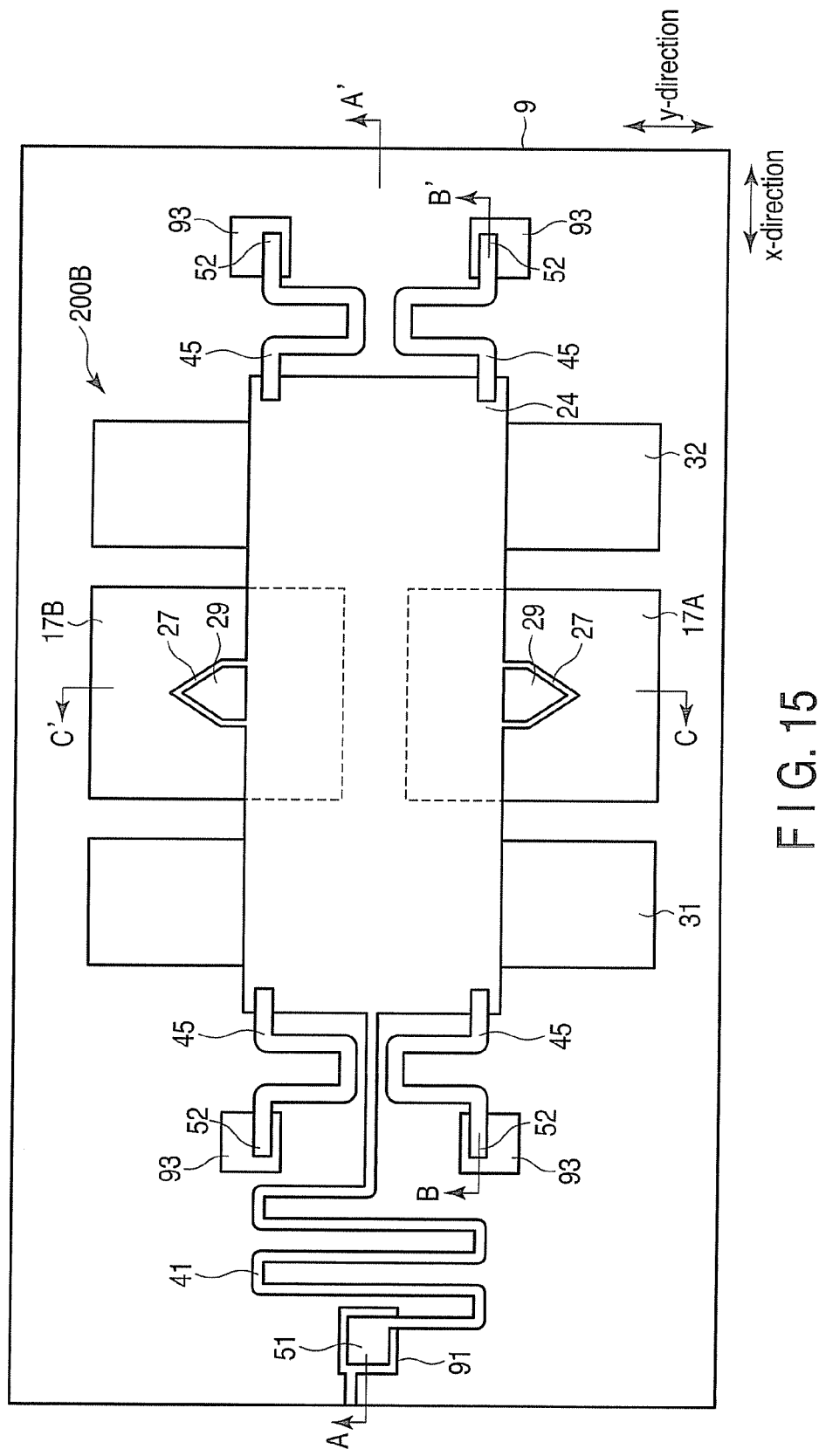
FIG. 15 is a plan view showing a structural example of the MEMS device according to the second embodiment.

A configuration of a MEMS switch 200B according to Structural Example 2 of this embodiment will now be described with reference to FIGS. 15 to 16B. FIG. 15 shows a planar structure of the MEMS switch 200B in this structural example. Each of FIGS. 16A and 16B shows a cross-sectional structure taken along line C-C' in FIG. 15. Further, FIGS. 16A and 16B show a state at the time of drive of the MEMS switch 200B. It should be noted that the cross-sectional structures taken along lines A-A' and B-B' in FIG. 15 are equal to the structures depicted in FIGS. 13A and 13B.

Here, a difference from the MEMS switch according to Structural Example 1 will be mainly explained.

In the MEMS switch 200B according to this structural example, contact portions 27 are provided at end portions of a movable structure 24 in place of providing dimples on a bottom surface of the movable structure 24.

As shown in FIGS. 15, 16A and 16B, the contact portions 27 extend from an outer peripheral portion of the movable structure 24 in the y-direction and the horizontal direction and also warp toward the lower side, i.e., toward signal electrodes 17A and 17B.

Furthermore, each contact portion 27 has a planar shape with a sharp end portion, and it has, e.g., a claw shape. An adjustment film 29 is provided on each contact portion 27. The adjustment film 29 is provided to cover an upper surface of the contact portion 27. The adjustment film 29 has a compressive internal stress larger than that of the contact portion 27. With this internal stress, the contact portion 27 warps toward the lower side. A material of the adjustment film 29 may be an insulator or a conductor as long as conditions for the internal stress are met. It should be noted that each adjustment film 29 may be provided on a bottom surface of the contact portion 27 as long as each contact portion 27 can warp toward the lower side.

A distance between the ends of the contact portions 27 and the signal electrodes 17A and 17B is shorter than a distance between the movable structure 24 and the signal electrodes 17A and 17B by an amount corresponding to the warp of each contact portion 27.

As described above, in this structural example, the movable structure 24 does not have dimples, and the ends of the contact portions 27 come into contact with the signal electrodes 17A and 17B.

As shown in FIG. 16A, when the contact portions 27 having the claw shape do not come into contact with the signal electrodes 17A and 17B, the MEMS switch 200B is in the OFF state.

As shown in FIG. 16B, the movable structure 24 moves toward the lower side by electrostatic attractive force produced between the movable structure 24 and the drive electrodes 31 and 32. Furthermore, when electrical conduction is achieved between the movable structure 24 and the signal electrodes 17A and 17B, the MEMS switch 200B enters the ON state. When the MEMS switch 200B has been turned on, the ends of the contact portions 27 having the claw shape alone come into contact with the signal electrodes 17A and 17B.

When the contact portions 27 come into contact with the electrodes 17A and 17B, the ends of the contact portions 27 scratch surfaces of electrodes 17A and 17B. Therefore, fouling on contact portions between the contact portions 27 and the electrodes 17A and 17B can be removed. Further, since the contact portions 27 have the sharp ends, contact force between the contact portions 27 and the electrodes 17A and 17B increases. Therefore, contact resistances can be reduced without increasing drive voltages.

As shown in FIGS. 15, 16A and 16B, in the MEMS switch 200B according to this Structural Example 2, the spring structure 41 having the ductile material and the spring structure 45 having the brittle material are connected to the movable structure 24. As a result, like the description in Structural Example 2, the MEMS switch 200B in this Structural Example 2 can suppress the influence of creep on the movable structure 24, thereby realizing low losses and high isolation.

Therefore, in the MEMS switch according to this Structural Example 2, the deterioration of characteristics of the element due to creep can be likewise suppressed.

Others

In the first and second embodiments, the MEMS devices that can suppress the deterioration of characteristics due to creep have been described. However, the embodiments are not restricted to the structures of the MEMS devices depicted in FIGS. 1 to 16. That is, in a given MEMS device, the movable structure (e.g., an electrode) used the ductile material and supported in midair is connected to the spring structure using the ductile material and the spring structure using the brittle material, the same effect as those of the MEMS devices described in the first and second embodiment can be of course obtained. It should be noted that, as described in Structural Example 2 of the first embodiment, the movable structure may be configured to be supported in midair by at least the spring structure using the brittle material.

For example, in an electrostatic drive type actuator, the upper drive electrode thereof may be connected to the spring structure using the ductile material and the spring structure using the brittle material.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A MEMS device comprising:
an electrode on a substrate;
a movable structure which is supported in midair above the electrode by first and second anchor portions on the substrate, and moves toward the electrode;
a first spring structure which connects the first anchor portion to the movable structure and uses a ductile material; and
a second spring structure which connects the second anchor portion to the movable structure and uses a brittle material, an one end of the second spring structure connected to the second anchor portion, an other end of the second spring structure connected to the movable structure, a spring constant of the second spring structure being larger than a spring constant of the first spring structure.

2. The device of claim 1, wherein the ductile material is a conductor, and the brittle material is an insulator.

3. The device of claim 1, wherein the ductile material is at least one material selected from a group consisting of Al, an alloy containing Al as a main component, Cu, Au and Pt.

4. The device of claim 1, wherein the brittle material is at least one material selected from a group consisting of Si, a compound containing Si as a main component, W, Mo and Al—Ti.

5. The device of claim 1, wherein the electrode is used as a first capacitive electrode of a capacitive element, and the movable structure is used as a second capacitive electrode of the capacitive element.

6. The device of claim 1, further comprising:
a first drive electrode on the substrate; and
a second drive electrode which is provided at one end of the movable structure, connected with the first and second spring structures, supported in midair above the first drive electrode, and moves toward the first drive electrode.

7. The device of claim 1, further comprising:
a contact portion which is connected with the movable structure and arranged above the electrode.

8. A MEMS device comprising:
an electrode on a substrate;
a movable structure which is supported in midair above the electrode by first and second anchor portions on the substrate;
a first spring structure which connects the first anchor portion to the movable structure and uses a ductile material; and
a second spring structure which connects the second anchor portion to the movable structure and uses a brittle material,
wherein a first potential is applied to the movable structure via the first spring structure.

9. The device of claim 8, wherein a spring constant of the second spring structure is larger than a spring constant of the first spring structure.

10. The device of claim 8, wherein the ductile material is at least one material selected from a group consisting of Al, an alloy containing Al as a main component, Cu, Au and Pt.

11. The device of claim 8, wherein the brittle material is at least one material selected from a group consisting of Si, a compound containing Si as a main component, W, Mo and Al—Ti.

12. The device of claim 8, wherein the electrode is used as a first capacitive electrode of a capacitive element, and the movable structure is used as a second capacitive electrode of the capacitive element.

13. The device of claim 8, further comprising:
a first drive electrode on the substrate; and
a second drive electrode which is provided at one end of the movable structure, connected with the first and second spring structures, supported in midair above the first drive electrode, and moves toward the first drive electrode.

14. The device of claim 8, further comprising:
a contact portion which is connected with the movable structure and arranged above the electrode.

15. A MEMS device comprising:
an electrode on a substrate;
a movable structure which is supported in midair above the electrode by first and second anchor portions on the substrate, and moves toward the electrode in a state in which a bottom surface of the movable structure is substantially a parallel to a top surface of the substrate;
a first spring structure which connects the first anchor portion to the movable structure and uses a ductile material; and
a second spring structure which connects the second anchor portion to the movable structure and uses a brittle material.

16. The device of claim 15, wherein a spring constant of the second spring structure is larger than a spring constant of the first spring structure.

17. The device of claim 15, wherein the ductile material is a conductor, and the brittle material is an insulator.

18. The device of claim 15, wherein the ductile material is at least one material selected from a group consisting of Al, an alloy containing Al as a main component, Cu, Au and Pt.

19. The device of claim 15, wherein the brittle material is at least one material selected from a group consisting of Si, a compound containing Si as a main component, W, Mo and Al—Ti.

20. The device of claim 15, wherein the electrode is used as a first capacitive electrode of a capacitive element, and the movable structure is used as a second capacitive electrode of the capacitive element.

21. The device of claim 15, further comprising:
a first drive electrode on the substrate; and
a second drive electrode which is provided at one end of the movable structure, connected with the first and second spring structures, supported in midair above the first drive electrode, and moves toward the first drive electrode.

22. The device of claim 15, further comprising:
a contact portion which is connected with the movable structure and arranged above the electrode.

* * * * *